United States Patent
Li et al.

(10) Patent No.: US 12,004,180 B2
(45) Date of Patent: Jun. 4, 2024

(54) DYNAMIC PHYSICAL UPLINK SHARED CHANNEL CONFIGURATION

(71) Applicant: QUALCOMM Incorporated, San Diego, CA (US)

(72) Inventors: Qiaoyu Li, Beijing (CN); Chao Wei, Beijing (CN); Yu Zhang, Beijing (CN); Liangming Wu, Beijing (CN); Chenxi Hao, Beijing (CN); Min Huang, Beijing (CN); Hao Xu, Beijing (CN); Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/426,556

(22) PCT Filed: Jan. 23, 2020

(86) PCT No.: PCT/CN2020/073997
§ 371 (c)(1),
(2) Date: Jul. 28, 2021

(87) PCT Pub. No.: WO2020/164394
PCT Pub. Date: Aug. 20, 2020

(65) Prior Publication Data
US 2022/0110147 A1    Apr. 7, 2022

(30) Foreign Application Priority Data
Feb. 12, 2019   (WO) ................ PCT/CN2019/074851

(51) Int. Cl.
*H04W 72/23*   (2023.01)
*H04B 7/06*    (2006.01)
*H04L 5/00*    (2006.01)

(52) U.S. Cl.
CPC .......... *H04W 72/23* (2023.01); *H04B 7/0639* (2013.01); *H04L 5/0048* (2013.01); *H04L 5/0091* (2013.01); *H04L 5/0023* (2013.01)

(58) Field of Classification Search
None
See application file for complete search history.

(56) References Cited

U.S. PATENT DOCUMENTS

| | | | |
|---|---|---|---|
| 8,953,522 | B2 | 2/2015 | Han et al. |
| 9,282,469 | B1 | 3/2016 | Park et al. |

(Continued)

FOREIGN PATENT DOCUMENTS

| | | | |
|---|---|---|---|
| CN | 105323032 | A | 2/2016 |
| CN | 107612599 | A | 1/2018 |

(Continued)

OTHER PUBLICATIONS

Supplementary European Search Report—EP20755767—Search Authority—Munich—dated Jan. 10, 2023.

(Continued)

*Primary Examiner* — Kenny S Lin
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station (BS), a first signaling communication that configures a plurality of transmit precoder matrix indicator (TPMI) and sounding reference signal (SRS) resource indicator (SRI) pairs. The plurality of TPMI and SRI pairs may be for transmitting respective physical uplink shared channel (PUSCH) communications to the BS. The UE may receive, from the BS, a second signaling communication that indicates an update to a TPMI and SRI pair of the plurality of TPMI and SRI pairs. The UE (Continued)

may transmit, to the BS, a PUSCH communication, of the respective PUSCH communications, based at least in part on the update to the TPMI and SRI pair. Numerous other aspects are provided.

30 Claims, 16 Drawing Sheets

(56) References Cited

U.S. PATENT DOCUMENTS

| | | | |
|---|---|---|---|
| 2018/0152961 A1 | 5/2018 | Yamazaki et al. | |
| 2019/0082448 A1* | 3/2019 | Nogami | H04L 5/0053 |
| 2019/0082456 A1* | 3/2019 | Kim | H04L 27/2602 |
| 2019/0103907 A1* | 4/2019 | Yang | H04L 25/03898 |
| 2019/0140729 A1* | 5/2019 | Zhang | H04W 52/16 |
| 2020/0162133 A1* | 5/2020 | Harrison | H04W 52/248 |
| 2020/0244335 A1* | 7/2020 | Nilsson | H04B 7/0452 |
| 2020/0336264 A1* | 10/2020 | Faxér | H04B 7/0456 |

FOREIGN PATENT DOCUMENTS

| | | | | |
|---|---|---|---|---|
| EP | 3902305 A1 * | 10/2021 | | H04L 5/0044 |
| WO | 2018132781 A1 | 7/2018 | | |
| WO | 2018228120 A1 | 12/2018 | | |

OTHER PUBLICATIONS

Supplementary Partial European Search Report—EP20755767—Search Authority—The Hague—dated Oct. 6, 2022.
International Search Report and Written Opinion—PCT/CN2020/073997—ISA/EPO—dated Apr. 23, 2020.
International Search Report and Written Opinion—PCT/CN2019/074851—ISA/EPO—dated Oct. 31, 2019.

* cited by examiner

DYNAMIC PHYSICAL UPLINK SHARED CHANNEL CONFIGURATION

CROSS-REFERENCE TO RELATED APPLICATIONS

This application is a 371 national stage of PCT Application No. PCT/CN2020/073997 filed on Jan. 23, 2020, entitled "DYNAMIC PHYSICAL UPLINK SHARED CHANNEL CONFIGURATION," which claims priority to International Patent Application No. PCT/CN2019/074851, filed on Feb. 12, 2019, entitled "DYNAMIC PHYSICAL UPLINK SHARED CHANNEL CONFIGURATION," which are hereby expressly incorporated by reference herein.

FIELD OF THE DISCLOSURE

Aspects of the present disclosure generally relate to wireless communication, and more particularly to techniques and apparatuses for dynamic physical uplink shared channel (PUSCH) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), a first signaling communication that configures a plurality of transmit precoder matrix indicator (TPMI) and sounding reference signal (SRS) resource indicator (SRI) pairs, wherein the plurality of TPMI and SRI pairs are to be used to transmit respective physical uplink shared channel (PUSCH) communications to the BS. The method may include receiving, from the BS, a second signaling communication that indicates an update to a TPMI and SRI pair of the plurality of TPMI and SRI pairs. The method may include transmitting, to the BS, a PUSCH communication, of the respective PUSCH communications, based at least in part on the update to the TPMI and SRI pair.

In some aspects, a UE for wireless communication may include memory and one or more processors operatively coupled to the memory. The memory and the one or more processors may be configured to receive, from a BS, a first signaling communication that configures a plurality of TPMI and SRI pairs, wherein the plurality of TPMI and SRI pairs are to be used to transmit respective PUSCH communications to the BS. The memory and the one or more processors may be configured to receive, from the BS, a second signaling communication that indicates an update to a TPMI and SRI pair of the plurality of TPMI and SRI pairs. The memory and the one or more processors may be configured to transmit, to the BS, a PUSCH communication, of the respective PUSCH communications, based at least in part on the update to the TPMI and SRI pair.

In some aspects, a non-transitory computer-readable medium may store one or more instructions for wireless communication. The one or more instructions, when executed by one or more processors of a UE, may cause the one or more processors to receive, from a BS, a first signaling communication that configures a plurality of TPMI and SRI pairs, wherein the plurality of TPMI and SRI pairs are to be used to transmit respective PUSCH communications to the BS. The one or more instructions, when executed by one or more processors of a UE, may cause the one or more processors to receive, from the BS, a second signaling communication that indicates an update to a TPMI and SRI pair of the plurality of TPMI and SRI pairs. The one or more instructions, when executed by one or more processors of a UE, may cause the one or more processors to transmit, to the BS, a PUSCH communication, of the respective PUSCH communications, based at least in part on the update to the TPMI and SRI pair.

In some aspects, an apparatus for wireless communication may include means for receiving, from a BS, a first signaling communication that configures a plurality of TPMI and SRI pairs, wherein the plurality of TPMI and SRI pairs are to be used to transmit respective PUSCH communications to the BS. The apparatus may include means for receiving, from the BS, a second signaling communication that indicates an update to a TPMI and SRI pair of the plurality of TPMI and SRI pairs. The apparatus may include means for transmitting, to the BS, a PUSCH communication, of the respective PUSCH communications, based at least in part on the update to the TPMI and SRI pair.

In some aspects, a method of wireless communication, performed by a UE, may include receiving, from a BS, a first signaling communication that configures a first TPMI and SRI pair, wherein the first TPMI and SRI pair is to be used to transmit a plurality of PUSCH communications to the BS. The method may include receiving, from the BS, a second signaling communication that indicates a second TPMI and SRI pair. The method may include transmitting, to the BS and using the second TPMI and SRI pair, a subset of the plurality of PUSCH communications.

In some aspects, a UE for wireless communication may include memory and one or more processors operatively coupled to the memory. The memory and the one or more processors may be configured to receive, from a BS, a first signaling communication that configures a first TPMI and SRI pair, wherein the first TPMI and SRI pair is to be used to transmit a plurality of PUSCH communications to the BS. The memory and the one or more processors may be configured to receive, from the BS, a second signaling communication that indicates a second TPMI and SRI pair. The memory and the one or more processors may be configured to transmit, to the BS and using the second TPMI and SRI pair, a subset of the plurality of PUSCH communications.

In some aspects, a non-transitory computer-readable medium may store one or more instructions for wireless communication. The one or more instructions, when executed by one or more processors of a UE, may cause the one or more processors to receive, from a BS, a first signaling communication that configures a first TPMI and SRI pair, wherein the first TPMI and SRI pair is to be used to transmit a plurality of PUSCH communications to the BS. The one or more instructions, when executed by one or more processors of a UE, may cause the one or more processors to receive, from the BS, a second signaling communication that indicates a second TPMI and SRI pair. The one or more instructions, when executed by one or more processors of a UE, may cause the one or more processors to transmit, to the BS and using the second TPMI and SRI pair, a subset of the plurality of PUSCH communications.

In some aspects, an apparatus for wireless communication may include means for receiving, from a BS, a first signaling communication that configures a first TPMI and SRI pair, wherein the first TPMI and SRI pair is to be used to transmit a plurality of PUSCH communications to the BS. The apparatus may include means for receiving, from the BS, a second signaling communication that indicates a second TPMI and SRI pair. The apparatus may include means for transmitting, to the BS and using the second TPMI and SRI pair, a subset of the plurality of PUSCH communications.

In some aspects, a method of wireless communication, performed by a BS, may include transmitting, to a UE, a first signaling communication that configures a plurality of TPMI and SRI pairs, wherein the plurality of TPMI and SRI pairs are to be used to transmit respective PUSCH communications to the BS. The method may include transmitting, to the UE, a second signaling communication that indicates an update to a TPMI and SRI pair of the plurality of TPMI and SRI pairs. The method may include receiving, from the UE, a PUSCH communication, of the respective PUSCH communications, based at least in part on the update to the TPMI and SRI pair.

In some aspects, a BS for wireless communication may include memory and one or more processors operatively coupled to the memory. The memory and the one or more processors may be configured to transmit, to a UE, a first signaling communication that configures a plurality of TPMI and SRI pairs, wherein the plurality of TPMI and SRI pairs are to be used to transmit respective PUSCH communications to the BS. The memory and the one or more processors may be configured to transmit, to the UE, a second signaling communication that indicates an update to a TPMI and SRI pair of the plurality of TPMI and SRI pairs. The memory and the one or more processors may be configured to receive, from the UE, a PUSCH communication, of the respective PUSCH communications, based at least in part on the update to the TPMI and SRI pair.

In some aspects, a non-transitory computer-readable medium may store one or more instructions for wireless communication. The one or more instructions, when executed by one or more processors of a BS, may cause the one or more processors to transmit, to a UE, a first signaling communication that configures a plurality of TPMI and SRI pairs, wherein the plurality of TPMI and SRI pairs are to be used to transmit respective PUSCH communications to the BS. The one or more instructions, when executed by one or more processors of a BS, may cause the one or more processors to transmit, to the UE, a second signaling communication that indicates an update to a TPMI and SRI pair of the plurality of TPMI and SRI pairs. The one or more instructions, when executed by one or more processors of a BS, may cause the one or more processors to receive, from the UE, a PUSCH communication, of the respective PUSCH communications, based at least in part on the update to the TPMI and SRI pair.

In some aspects, an apparatus for wireless communication may include means for transmitting, to a UE, a first signaling communication that configures a plurality of TPMI and SRI pairs, wherein the plurality of TPMI and SRI pairs are to be used to transmit respective PUSCH communications to the apparatus. The apparatus may include means for transmitting, to the UE, a second signaling communication that indicates an update to a TPMI and SRI pair of the plurality of TPMI and SRI pairs. The apparatus may include means for receiving, from the UE, a PUSCH communication, of the respective PUSCH communications, based at least in part on the update to the TPMI and SRI pair.

In some aspects, a method of wireless communication, performed by a BS, may include transmitting, to a UE, a first signaling communication that configures a first TPMI and SRI pair, wherein the first TPMI and SRI pair is to be used to transmit a plurality of PUSCH communications to the BS. The method may include transmitting, to the UE, a second signaling communication that indicates a second TPMI and SRI pair. The method may include receiving, from the UE and based at least in part on the second TPMI and SRI pair, a subset of the plurality of PUSCH communications.

In some aspects, a BS for wireless communication may include memory and one or more processors operatively coupled to the memory. The memory and the one or more processors may be configured to transmit, to a UE, a first signaling communication that configures a first TPMI and SRI pair, wherein the first TPMI and SRI pair is to be used to transmit a plurality of PUSCH communications to the BS. The memory and the one or more processors may be configured to transmit, to the UE, a second signaling communication that indicates a second TPMI and SRI pair. The memory and the one or more processors may be configured to receive, from the UE and based at least in part on the second TPMI and SRI pair, a subset of the plurality of PUSCH communications.

In some aspects, a non-transitory computer-readable medium may store one or more instructions for wireless communication. The one or more instructions, when executed by one or more processors of a BS, may cause the one or more processors to transmit, to a UE, a first signaling communication that configures a first TPMI and SRI pair, wherein the first TPMI and SRI pair is to be used to transmit a plurality of PUSCH communications to the BS. The one or more instructions, when executed by one or more processors of a BS, may cause the one or more processors to transmit, to the UE, a second signaling communication that indicates a second TPMI and SRI pair. The one or more instructions, when executed by one or more processors of a BS, may cause the one or more processors to receive, from the UE and based at least in part on the second TPMI and SRI pair, a subset of the plurality of PUSCH communications.

In some aspects, an apparatus for wireless communication may include means for transmitting, to a UE, a first signaling communication that configures a first TPMI and SRI pair, wherein the first TPMI and SRI pair is to be used to transmit a plurality of PUSCH communications to the apparatus. The apparatus may include means for transmitting, to the UE, a second signaling communication that indicates a second TPMI and SRI pair. The apparatus may include means for receiving, from the UE and based at least in part on the second TPMI and SRI pair, a subset of the plurality of PUSCH communications.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
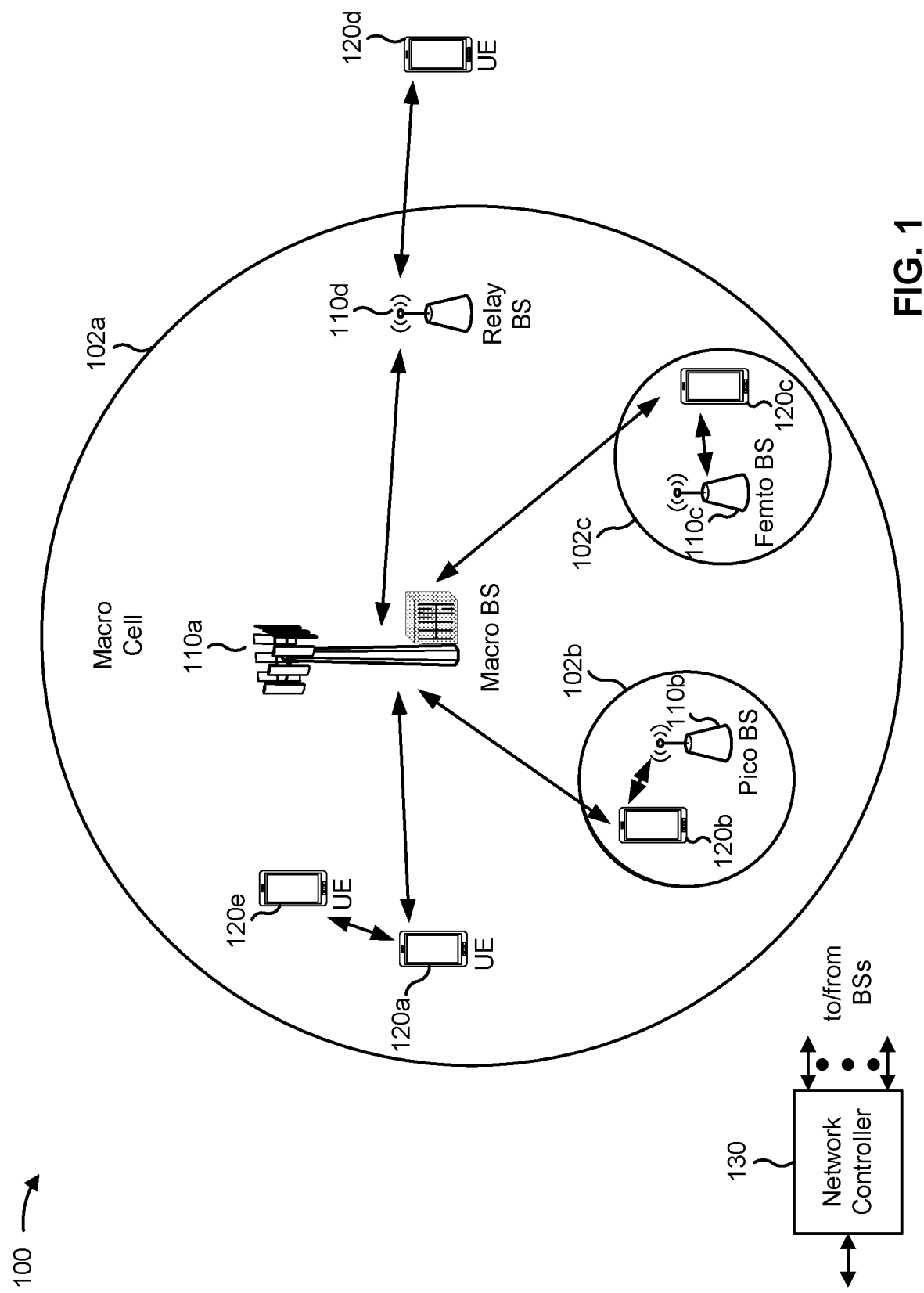
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
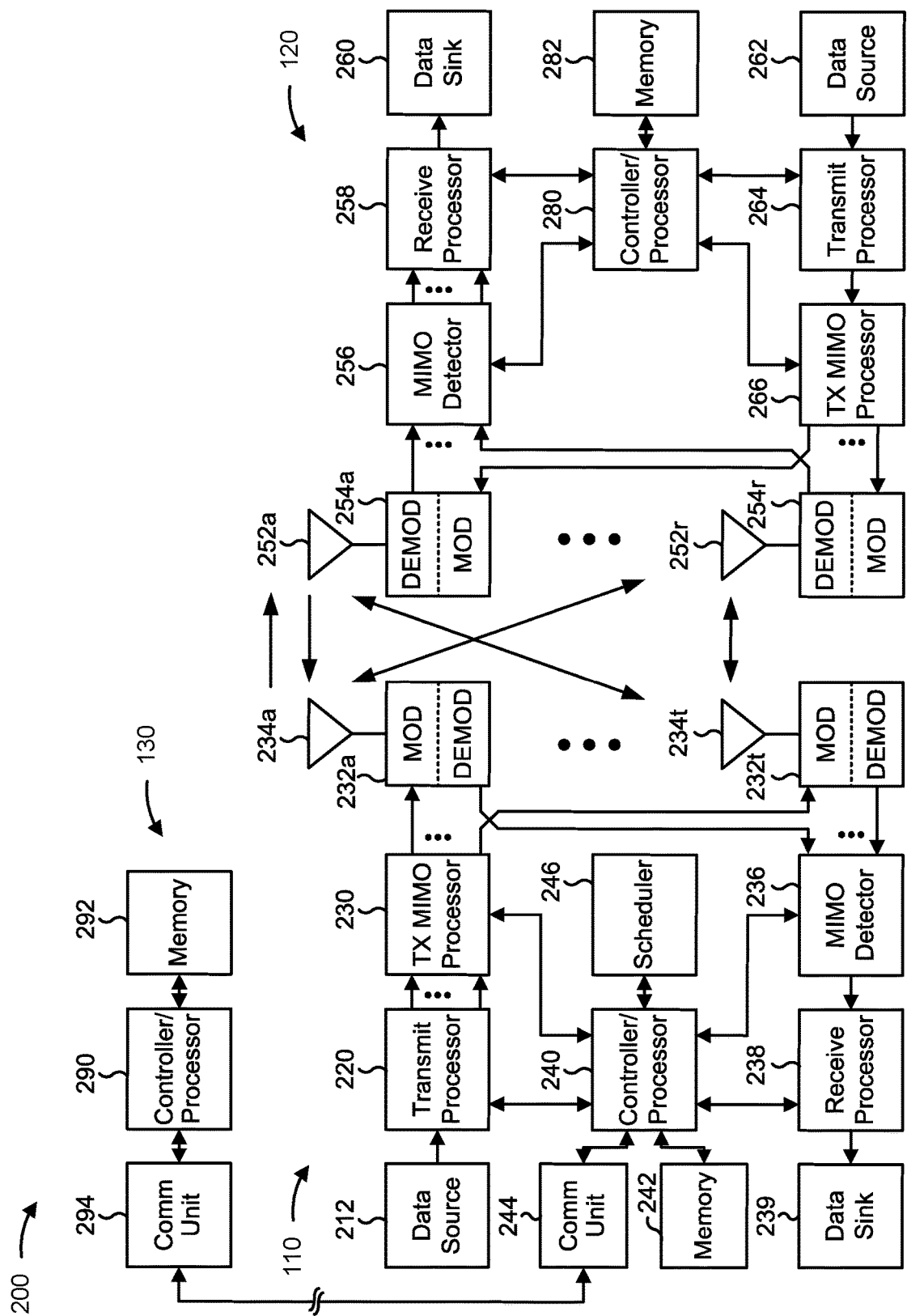
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic physical uplink shared channel (PUSCH) configuration, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a BS 110, a first signaling communication that configures a plurality of transmit precoder matrix indicator (TPMI) and sounding reference signal (SRS) resource indicator (SRI) pairs, wherein the plurality of TPMI and SRI pairs are to be used to transmit respective PUSCH communications to the BS 110, means for receiving, from the BS 110, a second signaling communication that indicates an update to a TPMI and SRI pair of the plurality of TPMI and SRI pairs, means for transmitting, to the BS 110, a PUSCH communication, of the respective PUSCH communications, based at least in part on the update to the TPMI and SRI pair, and/or the like. In some aspects, UE 120 may include means for receiving, from a BS 110, a first signaling communication that configures a first TPMI and SRI pair, wherein the first TPMI and SRI pair is to be used to transmit a plurality of PUSCH communications to the BS 110, means for receiving, from the BS 110, a second signaling communication that indicates a second TPMI and SRI pair, means for transmitting, to the BS 110 and using the second TPMI and SRI pair, a subset of the plurality of PUSCH communications, and/or the like. In some aspects, such means may include one or more components of UE 120 described in connection with FIG. 2.

In some aspects, base station 110 may include means for transmitting, to a UE 120, a first signaling communication that configures a plurality of TPMI and SRI pairs, wherein the plurality of TPMI and SRI pairs are to be used to transmit respective PUSCH communications to the BS, means for transmitting, to the UE 120, a second signaling communication that indicates an update to a TPMI and SRI pair of the plurality of TPMI and SRI pairs, means for receiving, from the UE 120, a PUSCH communication, of the respective PUSCH communications, based at least in part on the update to the TPMI and SRI pair, and/or the like. In some aspects, base station 110 may include means for transmitting, to a UE 120, a first signaling communication that configures a first TPMI and SRI pair, wherein the first TPMI and SRI pair is to be used to transmit a plurality of PUSCH communications to the BS 110, means for receiving, from the UE 120 and based at least in part on the second TPMI and SRI pair, a subset of the plurality of PUSCH communications, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
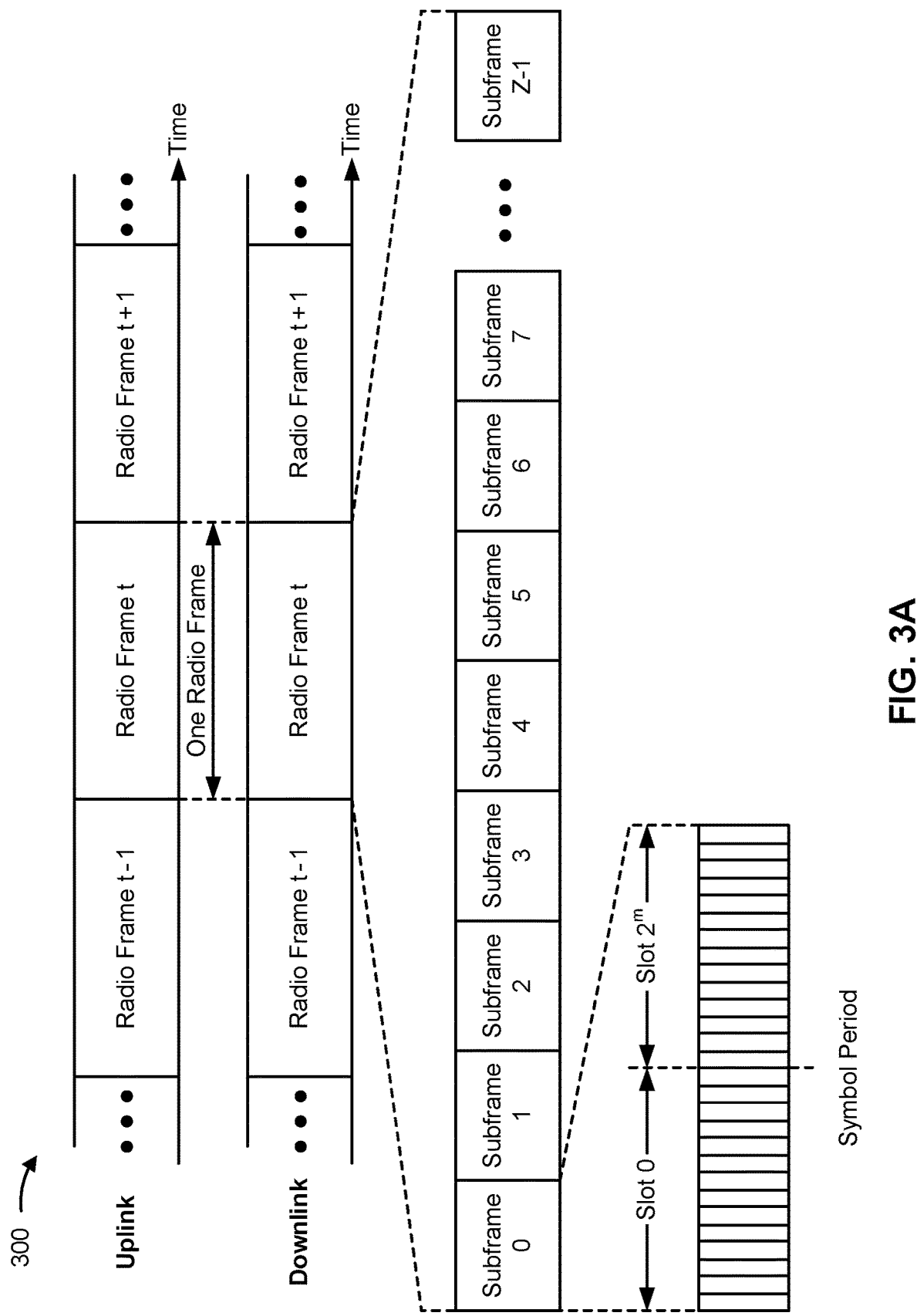
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
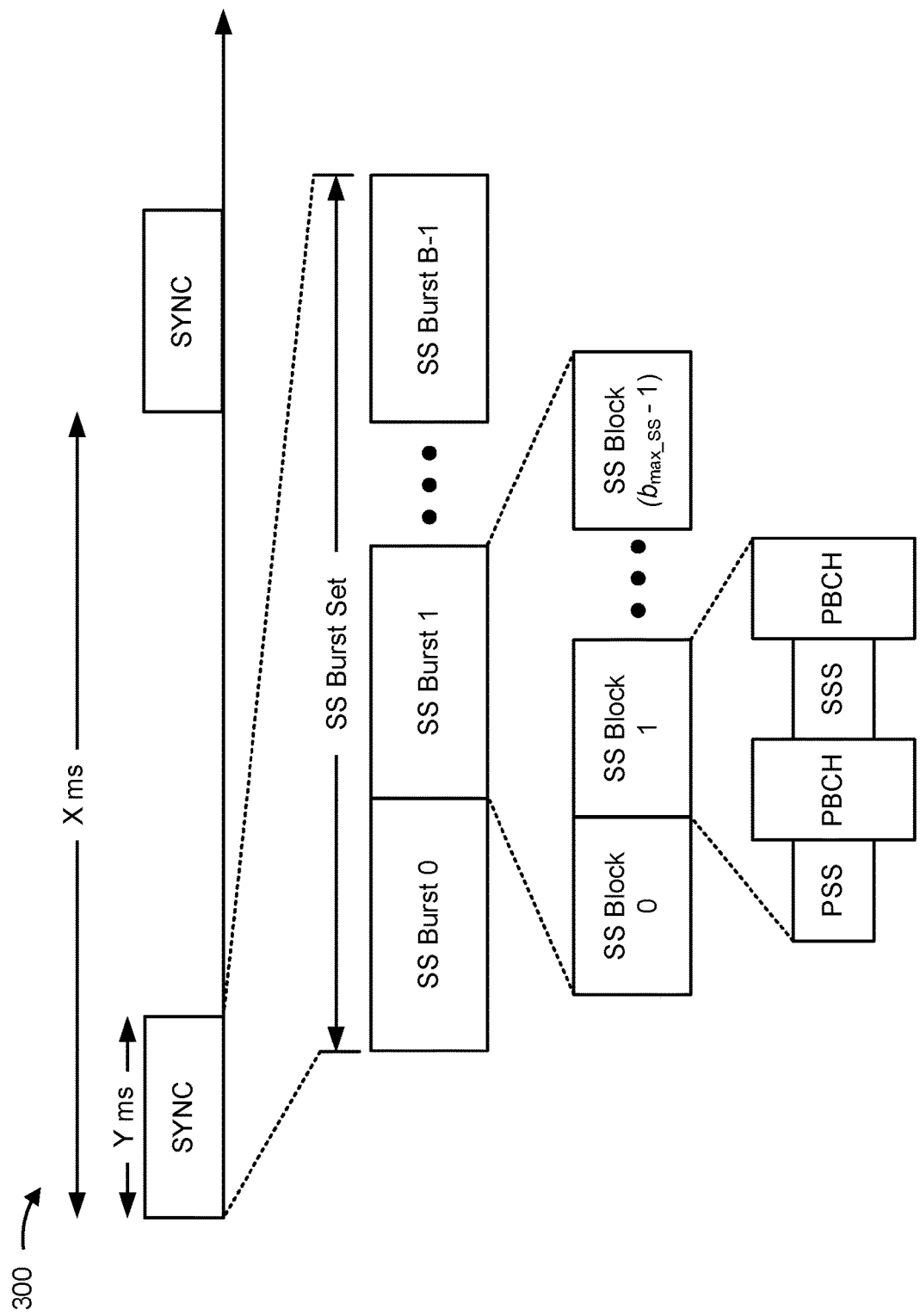
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
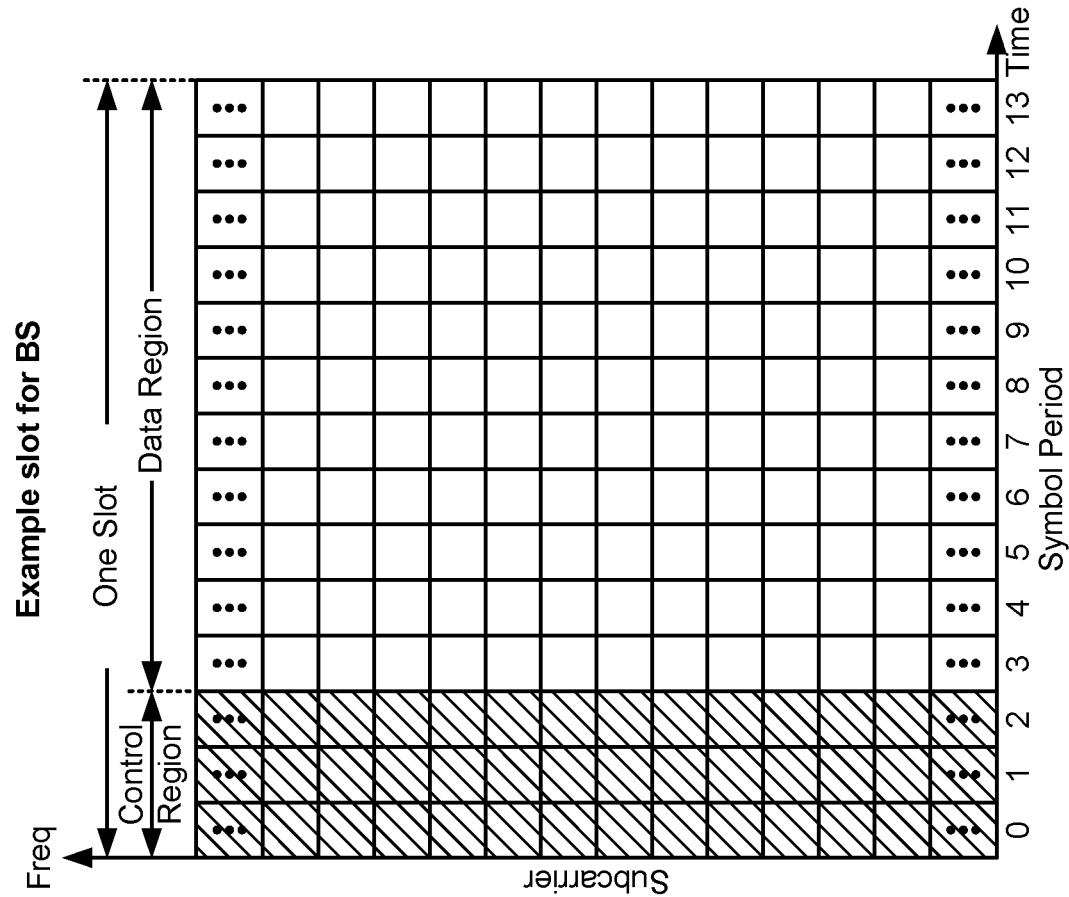
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
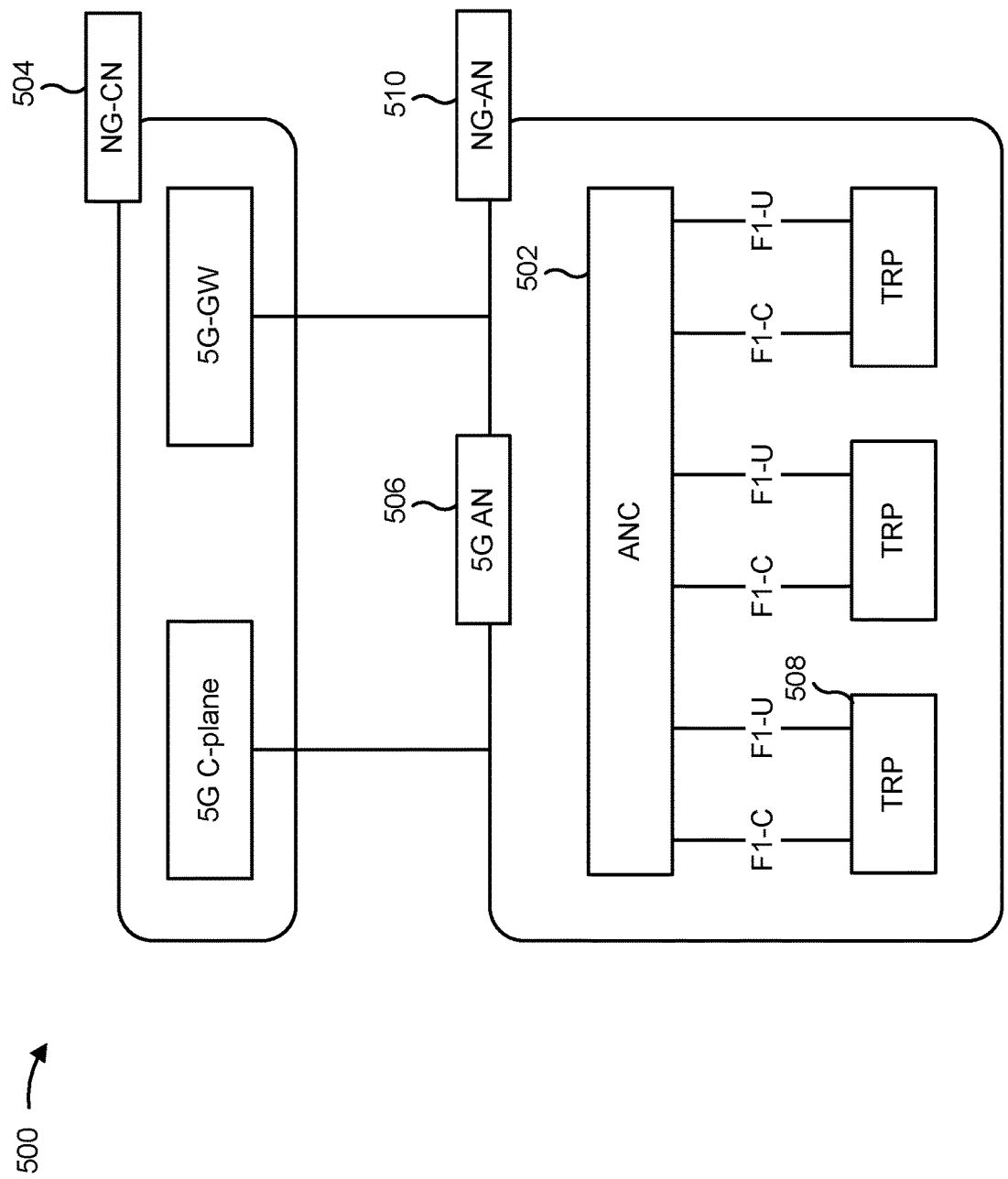
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
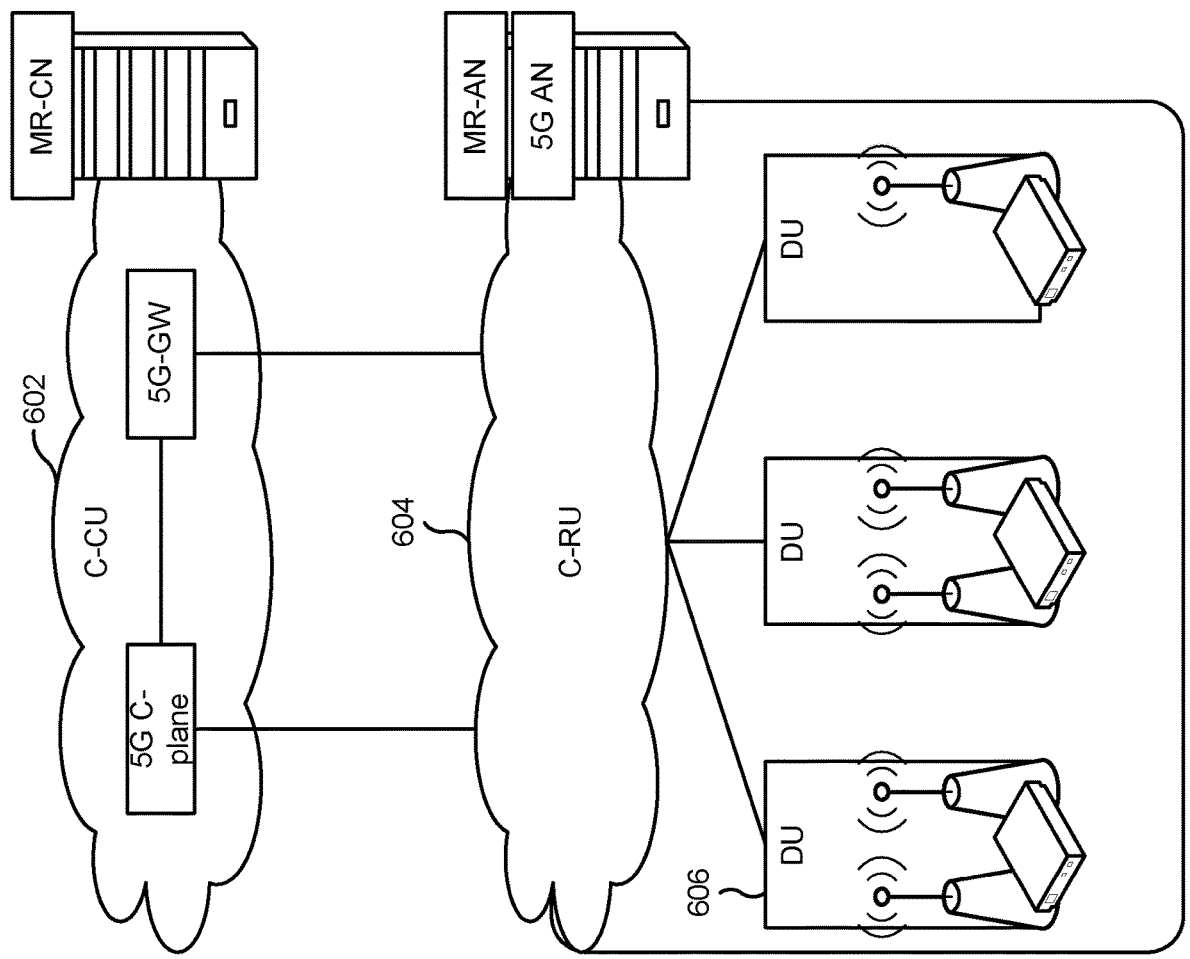
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Figure 7:
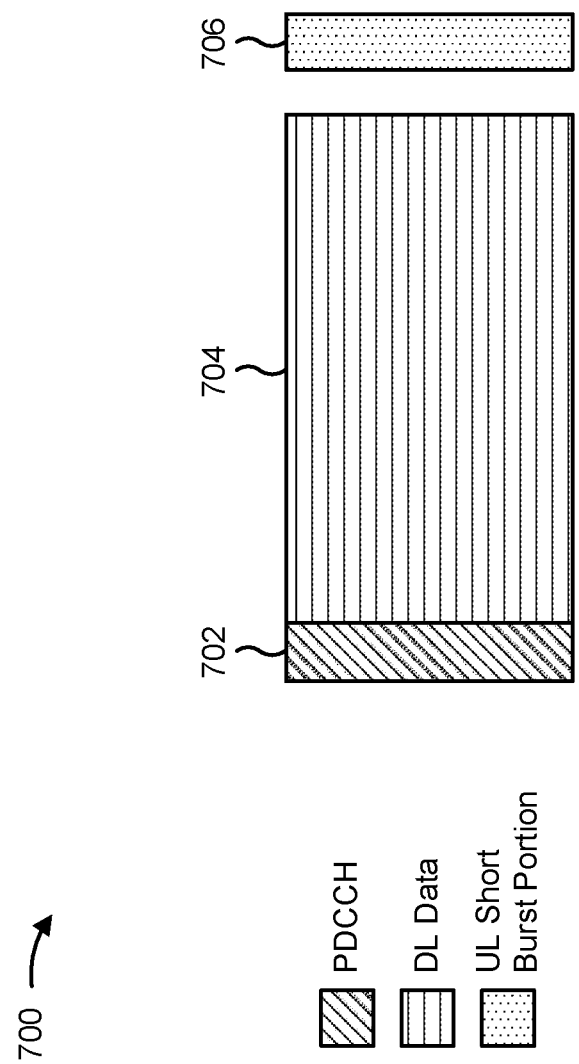
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a PDCCH, as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a PDSCH.

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 7 is provided as an example. Other examples may differ from what is described with regard to FIG. 7.

Figure 8:
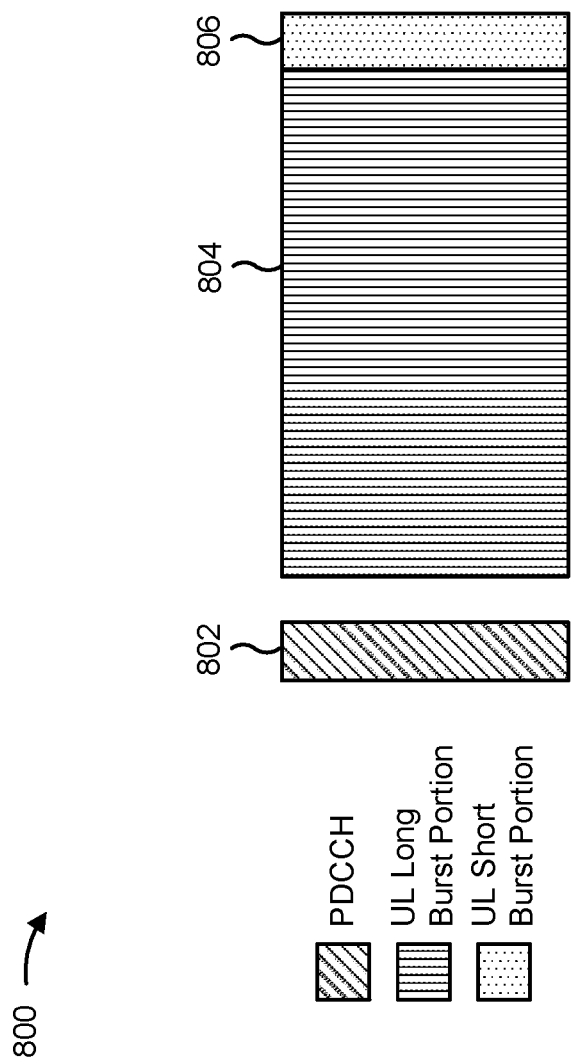
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a PDCCH.

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided as an example. Other examples may differ from what is described with regard to FIG. 8.

In a wireless network, a UE may communicate with a BS by transmitting a PUSCH communication on an uplink of a wireless communication link between the UE and the BS. The BS may configure one or more parameters for transmitting the PUSCH communication on the uplink. In some cases, the BS may configure the one or more parameters by transmitting a PUSCH configured grant to the UE. The PUSCH configured grant may include a Type-1 PUSCH configured grant or a Type-2 PUSCH configured grant. A Type-1 PUSCH configured grant may include a PUSCH configured grant that is configured and activated via radio resource control (RRC) signaling. A Type-2 PUSCH configured grant may include a PUSCH configured grant that is configured via RRC signaling and activated via downlink control information (DCI) signaling.

To establish the PUSCH configured grant, the BS may configure the UE (e.g., via a master information block (MIB), a system information block (SIB), and/or the like) with a sounding reference signal (SRS) set that indicates time and frequency resources for transmitting a plurality of SRSs to the BS. The BS may receive and perform one or more measurements associated with the plurality of SRSs to determine the one or more parameters for the PUSCH configured grant.

For example, the BS may identify, based at least in part on the one or more measurements of the plurality of SRSs, the time and frequency resources that the UE is to use to transmit PUSCH communications on the uplink, and may indicate, in the PUSCH configured grant, an SRS resource indicator (SRI) associated with the time and frequency resources. If the PUSCH communications are to be transmitted using a codebook-based transmission, the BS may also indicate, in the PUSCH configured grant, a transmit precoding matrix indicator (TPMI) associated with a precoder that the UE is to use to transmit the PUSCH communications.

In some cases, one or more components in the wireless network (e.g., the BS, an access management function (AMF) component, a user plane function (UPF) component, a session management function (SMF) component, and/or the like) may determine that the UE is to switch to using a different SRI and/or TPMI for PUSCH transmission. In this case, the BS may need to reconfigure the UE to use another TPMI and/or SRI. For example, for a Type-1 PUSCH configured grant, the BS may reconfigure the UE with another TPMI and/or SRI by transmitting, to the UE, an RRC reconfiguration communication that indicates the other TPMI and/or SRI. As another example, for a Type-1 PUSCH configured grant, the BS may reconfigure the UE with another TPMI and/or SRI by transmitting, to the UE, another DCI communication to activate another PUSCH configured grant that indicates the other TPMI and/or SRI. Either of the techniques for reconfiguration, described above, may result in long delays in PUSCH communications (e.g., up to 100 ms or more), which in turn can degrade PUSCH performance on the uplink.

Some aspects, described herein, provide techniques and apparatuses for dynamic PUSCH configuration. In some aspects, a BS may transmit, to a UE, a first signaling communication that configures a plurality of TPMI and SRI pairs. The UE may periodically cycle through the plurality of TPMI and SRI pairs to transmit PUSCH communications on an uplink to the BS. In this way, the UE may switch to different TPMI and SRI pairs without having to wait for additional signaling from the BS. This reduces the delay between PUSCH communications, which increases PUSCH performance on the uplink. Moreover, this reduces the amount of signaling communications that the BS needs to transmit in order for the UE to be capable of switching to different TPMI and SRI pairs, which in turn reduces radio resource usage on the downlink.

Figure 9A:
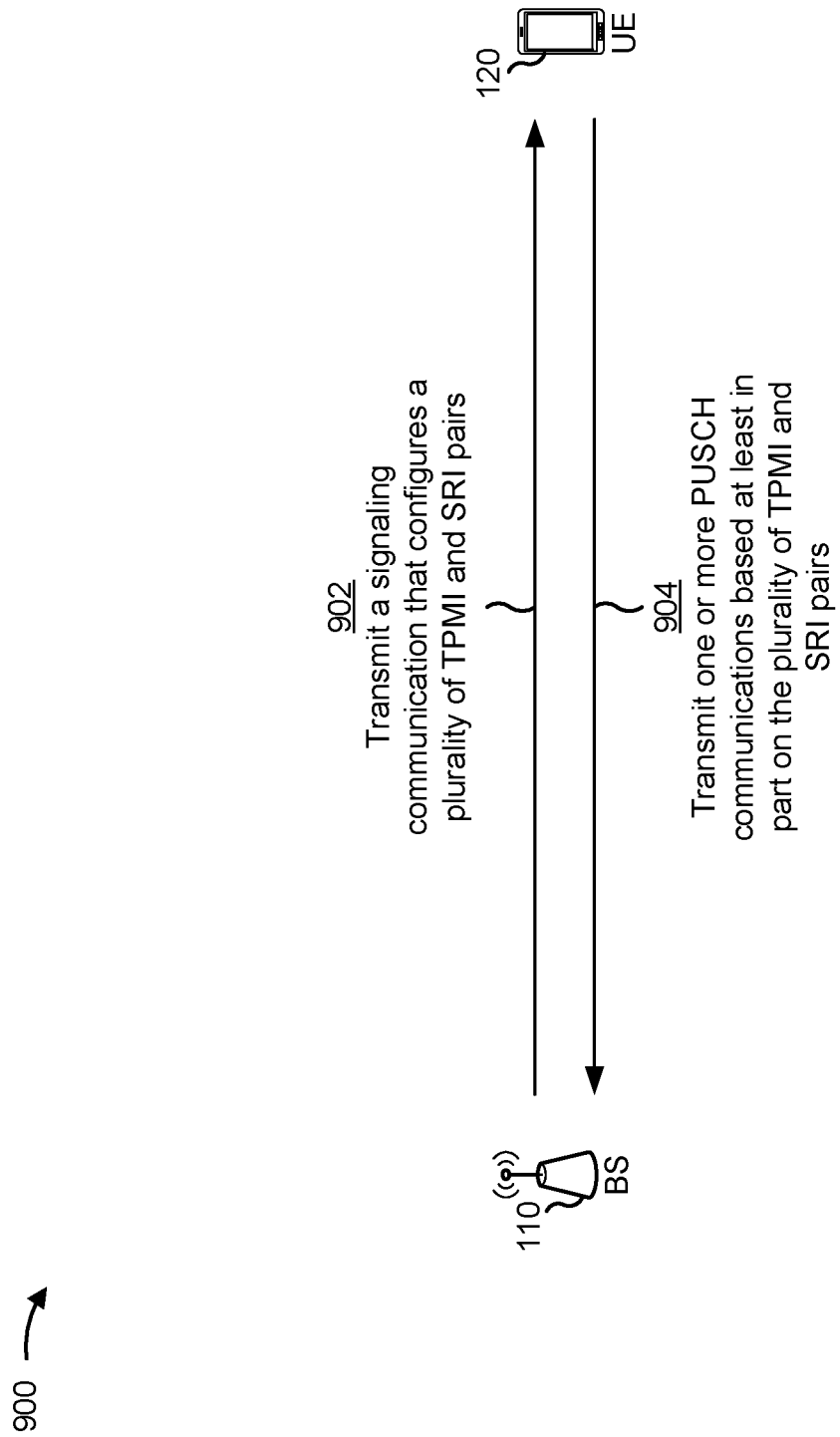
FIGS. 9A-9C are diagrams illustrating an example of dynamic physical uplink shared channel (PUSCH) configuration, in accordance with various aspects of the present disclosure.
Figure 9B:
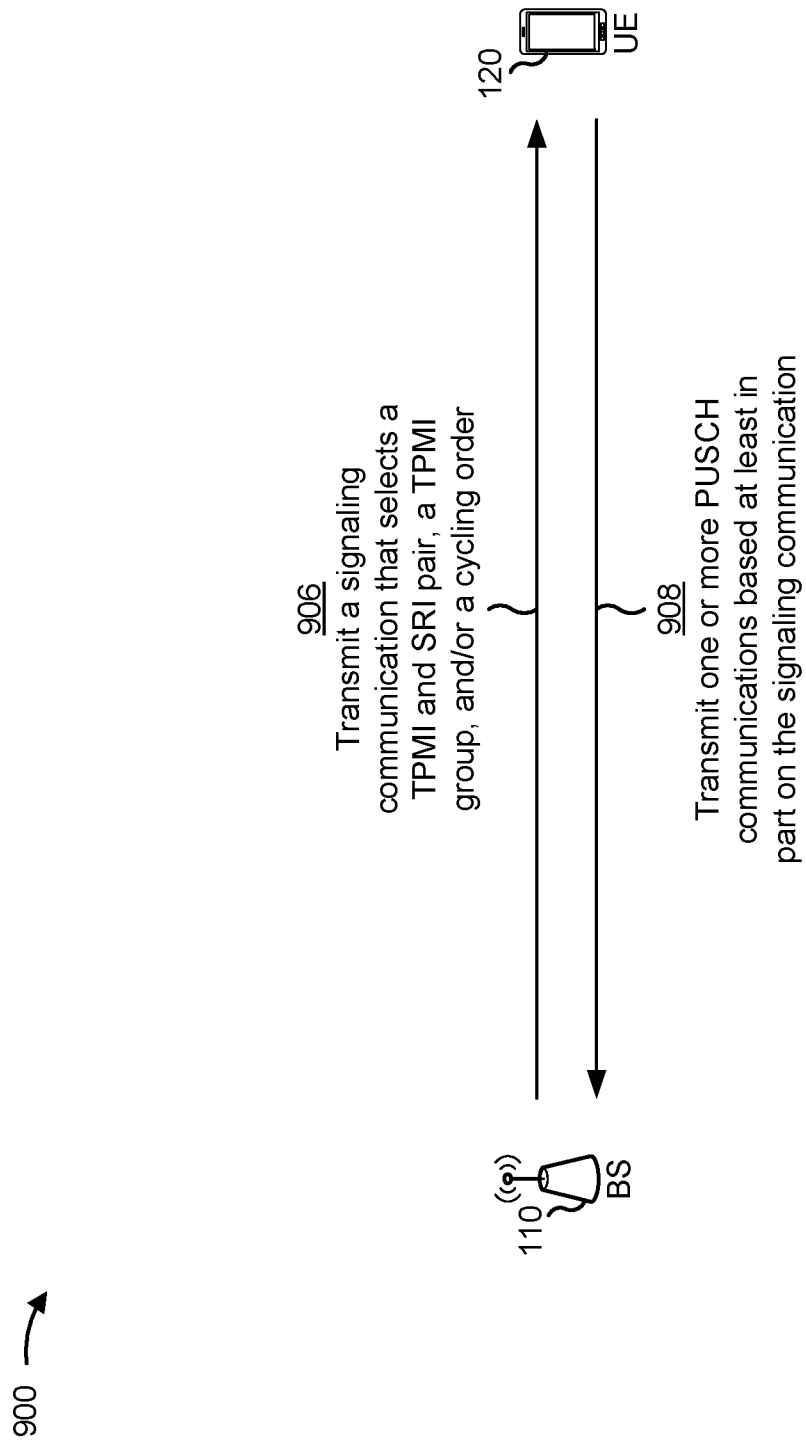
Figure 9C:
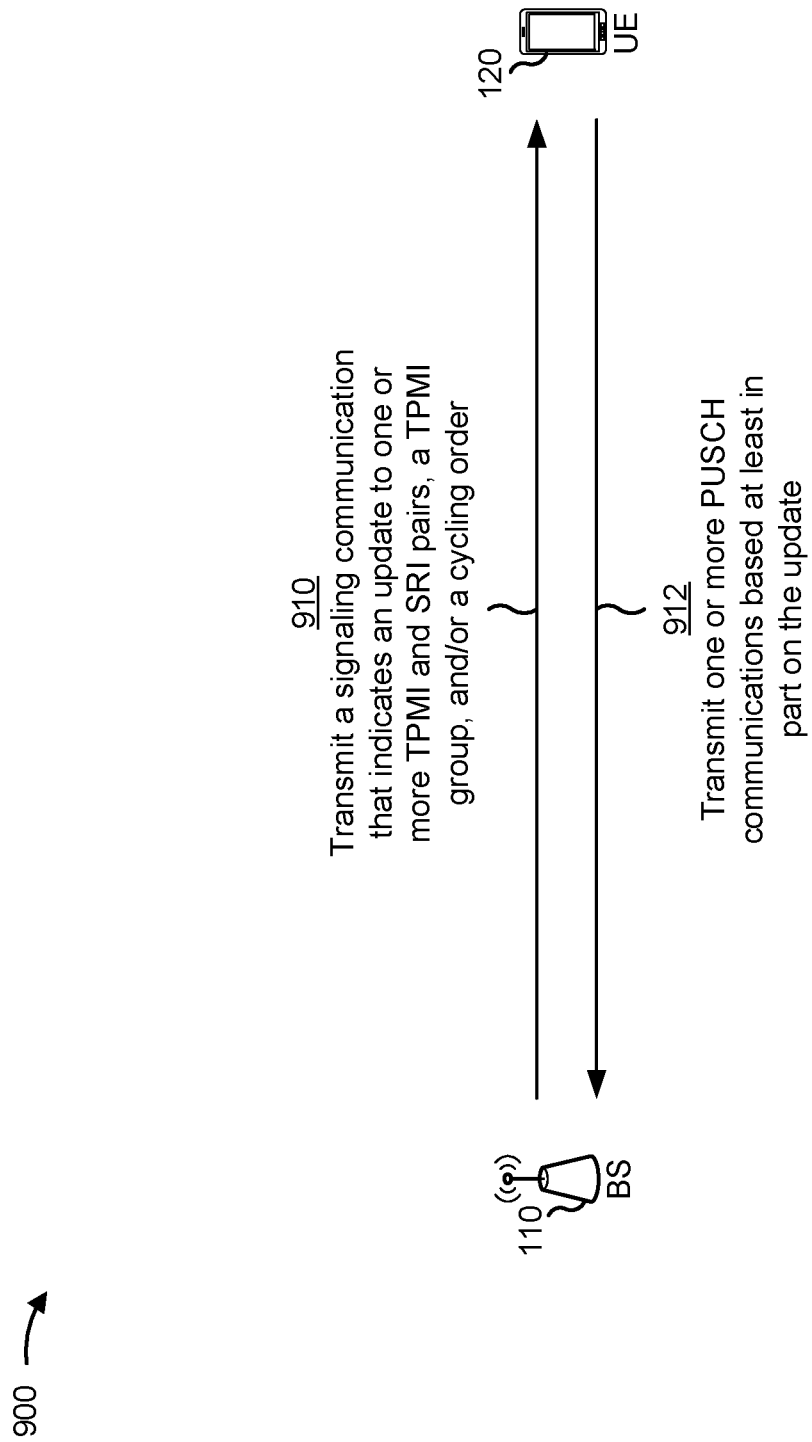

FIGS. 9A-9C are diagrams illustrating an example 900 of dynamic PUSCH configuration, in accordance with various aspects of the present disclosure. As shown in FIGS. 9A-9C, example 900 may include a BS (e.g., BS 110) and a UE (e.g., UE 120). In some aspects, BS 110 and UE 120 may be included in a wireless network. BS 110 and UE 120 may be communicatively connected and may communicate via a wireless communication link. The wireless communication link may include a downlink (e.g., a link that permits communication from BS 110 to UE 120) and an uplink (e.g., a link that permits communication from UE 120 to BS 110).

In some aspects, BS 110 may configure one or more parameters for UE 120 to transmit PUSCH communications on the uplink. In some aspects, BS 110 may configure the one or more parameters based at least in part on receiving a scheduling request (SR) communication from UE 120, based at least in part on detecting one or more SRSs transmitted from UE 120, and/or the like.

As shown in FIG. 9A, and by reference number 902, BS 110 may transmit, to UE 120, a signaling communication that configures the one or more parameters. The signaling communication may be a PUSCH configured grant, which may include an RRC communication, a DCI communication, and/or the like. In some aspects, the one or more parameters may include a TPMI and SRI pair. In some aspects, the one or more parameters may include a plurality of TPMI and SRI pairs.

In some aspects, BS 110 may select the TPMI and SRI pair, or the plurality of TPMI and SRI pairs, by performing one or more channel quality measurements associated with the one or more SRSs transmitted from UE 120 in order to determine a channel quality for each respective portion of the uplink associated with the one or more SRSs. In some aspects, BS 110 may select the TPMI and SRI pairs associated with the uplink resources on which the highest channel quality measurements were obtained. In some aspects, BS 110 may select the TPMI and SRI pairs associated with uplink resources on which channel quality measurements that satisfy a channel quality threshold were obtained.

In some aspects, if the one or more parameters include a plurality of TPMI and SRI pairs, each TPMI and SRI pair may include a different TPMI and SRI. In some aspects, if the one or more parameters include a plurality of TPMI and SRI pairs, one or more TPMI and SRI pairs may include a same TPMI and/or SRI as one or more other TPMI and SRI pairs.

In some aspects, BS 110 may explicitly indicate, in the signaling communication, the plurality of TPMI and SRI pairs. That is, the signaling communication may include information identifying each TPMI and SRI included in the plurality of TPMI and SRI pairs. For example, each TPMI may be explicitly indicated by a TPMI index and each SRI may be explicitly indicated by an SRI index.

In some aspects, the signaling communication may implicitly indicate the plurality of TPMI and SRI pairs. For example, sets of TPMIs included in the plurality of TPMI and SRI pairs may be associated with respective TPMI group identifiers, and BS 110 may specify the TPMI group identifiers in the signaling communication. In this case, UE 120 may identify the TPMI group identifiers in the signaling communication, and may perform a lookup in a table and/or another data structure to identify the sets of TPMIs, included in the plurality of TPMI and SRI pairs, based at least in part on the TPMI group identifiers. In some aspects, the SRIs associated with the TPMIs, included in the plurality of TPMI and SRI pairs, may also be indicated in the table and/or other data structure. In some aspects, the SRIs associated with the TPMIs, included in the plurality of TPMI and SRI pairs, may be explicitly indicated in the signaling communication.

As further shown in FIG. 9A, and by reference number 904, UE 120 may receive the signaling communication and may transmit one or more PUSCH communication based at least in part on the TPMI and SRI pair or the plurality of TPMI and SRI pairs indicated in the signaling communication. In some aspects, UE 120 may identify the TPMI and SRI pair or plurality of TPMI and SRI pairs by identifying an explicit indication in the signaling communication, by identifying an implicit indication and performing a lookup, and/or the like.

In some aspects, if the signaling communication indicates a TPMI and SRI pair, UE 120 may transmit the one or more PUSCH communications by identifying a codebook associated with the TPMI, precoding the one or more PUSCH communications based at least in part on the codebook, and transmitting the one or more PUSCH communications using the uplink radio resources associated with the SRI.

In some aspects, if the signaling communication indicates a plurality of TPMI and SRI pairs, UE 120 may transmit the one or more PUSCH communications using the plurality of TPMI and SRI pairs in a non-cycled manner or in a cycled manner. For example, if UE 120 transmits the one or more PUSCH communications using the plurality of TPMI and SRI pairs in a non-cycled manner, UE 120 may transmit PUSCH communications using the same TPMI and SRI pair, of the plurality of TPMI and SRI pairs, until instructed (e.g., by BS 110) to switch to another TPMI and SRI pair of the plurality of TPMI and SRI pairs.

As another example, if UE 120 transmits the one or more PUSCH communications using the plurality of TPMI and SRI pairs in a cycled manner, UE 120 may transmit a plurality of PUSCH communications using respective TPMI and SRI pairs. In this case, UE 120 may transmit a first PUSCH communication using a first TPMI and SRI pair, may transmit a second PUSCH communication using a second TPMI and SRI pair, and so on.

In some aspects, the cycling order (i.e., the order in which UE 120 is to cycle through the plurality of TPMI and SRI pairs) may be specified in the first signaling communication. In some aspects, the cycling order may be specified in a table or another data structure configured at UE 120. In some aspects, the cycling order may be specified in telecommunications standard that is implemented in the wireless network. In some aspects, BS 110 may transmit, in the signaling communication, a plurality of candidate cycling orders, and may periodically select the cycling order, from the plurality of candidate cycling orders, that UE 120 is to use to cycle through the plurality of TPMI and SRI pairs.

In some aspects, UE 120 may use a hybrid cycling technique to transmit PUSCH communications using the plurality of TPMI and SRI pairs. For example, if sets of TPMIs, included in the plurality of TPMI and SRI pairs, are included in respective TPMI groups, UE 120 may transmit PUSCH communications by cycling through TPMI and SRI pairs included in a first TPMI group, and may switch to a second TPMI group based at least in part on receiving an instruction to switch to the second TPMI group.

In some aspects, the signaling communication, a table or other data structure, and/or the like, may specify a cycling order for TPMI groups associated with the plurality of TPMI and SRI pairs. In some aspects, BS 110 may transmit, in the signaling communication, a plurality of candidate cycling orders, and may periodically select the cycling order, from the plurality of candidate cycling orders, that UE 120 is to use to cycle through the TPMI groups.

Turning to FIG. 9B, in some aspects, BS 110 may instruct UE 120 to switch to another TPMI and SRI pair, another TPMI group, and/or another cycling order. As shown by reference number 906, BS 110 may transmit another signaling communication (e.g., another RRC communication, another DCI communication, and/or the like) that selects a TPMI and SRI pair, a TPMI group, and/or cycling order to which UE 120 is to switch. In this way, if the signaling communication indicated a TPMI and SRI pair, BS 110 may permit UE 120 to switch to another TPMI and SRI pair. Moreover, in this way, if the signaling communication indicated a plurality of TPMI and SRI pairs (or TPMI groups associated with the plurality of TPMI and SRI pairs), and UE 120 is to use the plurality of TPMI and SRI pairs in a non-cycled manner, BS 110 may select the next TPMI and SRI pair (and/or TPMI group), of the plurality of TPMI and SRI pairs, that UE 120 is to use to transmit PUSCH communications. Moreover, in this way, if the signaling communication indicated a plurality of candidate cycling orders, BS 110 may select a cycling order from the plurality of candidate cycling orders.

In some aspects, the TPMI and SRI pair, the TPMI group, and/or the cycling order, may be explicitly indicated in the other signaling communication, may be implicitly indicated by the other signaling communication, or may be indicated by a combination of explicit and implicit indications. For example, the TPMI may be implicitly indicated by a TPMI index, which UE 120 may use to perform a lookup (e.g., in a table or another data structure), and the SRI may be explicitly indicated in the other signaling communication.

In some aspects, the TPMI and SRI pair, the TPMI group, and/or the cycling order may be indicated in the other signaling communication along with information directed to one or more other UEs. In this case, BS 110 may scramble the other signaling communication using a group common radio network temporary identifier (GC-RNTI) associated with UE 120 and the one or more other UEs to direct the other signaling communication to UE 120 and the one or more other UEs. In this way, only UE 120 and the one or more other UEs are capable of descrambling and reading the other signaling communication.

Moreover, BS 110 may locate, in the other signaling communication, the indication of the TPMI and SRI pair, the TPMI group, and/or the cycling order based at least in part on a search offset. The search offset may indicate a location, in the other signaling communication, relative to a beginning of the other signaling communication. In this way, UE 120 may use the search offset to identify the indication of the TPMI and SRI pair, the TPMI group, and/or the cycling order in the other signaling communication. In some aspects, UE 120 may be configured with information identifying the search offset. In some aspects, BS 110 may indicate the search offset to UE 120 in the signaling communication and/or another communication.

As further shown in FIG. 9B, and by reference number 908, UE 120 may receive the other signaling communication and may switch to the TPMI and SRI pair, the TPMI group, and/or the cycling order indicated by the other signaling communication. In this case, UE 120 may use the TPMI and SRI pair, the TPMI group, and/or the cycling order indicated by the other signaling communication, to transmit one or more PUSCH communications.

In some aspects, UE 120 may identify the TPMI and SRI pair, the TPMI group, and/or the cycling order in the other signaling communication by descrambling the other signaling communication based at least in part on the GC-RNTI and identifying the location of the TPMI and SRI pair, the TPMI group, and/or the cycling order based at least in part on the search offset.

Turning to FIG. 9C, in some aspects, BS 110 may provide TPMI and SRI pair updates to UE 120. For example, BS 110 may update a TPMI and SRI pair by associating a different SRI with the TPMI included in the TPMI and SRI pair or vice-versa. As another example, BS 110 may update the plurality of TPMI and SRI pairs by removing TPMI and SRI pairs from the plurality of TPMI and SRI pairs, by adding TPMI and SRI pairs from the plurality of TPMI and SRI pairs, by specifying another plurality of TPMI and SRI pairs, and/or the like. As a further example, BS 110 may update a cycling order associated with one or more TPMI and SRI pairs (or associated with TPMI groups) of the plurality of TPMI and SRI pairs.

As shown by reference number 910, BS 110 may transmit another signaling communication that indicates an update to one or more TPMI and SRI pairs, to a TPMI group, and/or to a cycling order. In some aspects, the other signaling communication may include another RRC communication, another DCI communication, and/or the like. In some aspects, the other signaling communication may schedule a retransmission of a PUSCH communication. In some aspects, the other signaling communication may include a PUSCH ACK (e.g., an indication that a PUSCH communication was successfully received and decoded).

In some aspects, the update may be indicated in the other signaling communication along with updates directed to one or more other UEs. In this case, BS 110 may scramble the other signaling communication using the GC-RNTI associated with UE 120 and the one or more other UEs to direct the other signaling communication to UE 120 and the one or more other UEs. In this way, only UE 120 and the one or more other UEs are capable of descrambling and reading the other signaling communication. Moreover, BS 110 may locate, in the other signaling communication, the indication of the update based at least in part on a search offset. The search offset may indicate a location, in the other signaling communication, relative to a beginning of the other signaling communication. In this way, UE 120 may use the search offset to identify the indication of the update in the other signaling communication.

As further shown in FIG. 9C, and by reference number 912, UE 120 may receive the other signaling communication and may transmit one or more PUSCH communications based at least in part on the update indicated by the other signaling communication. In this case, UE 120 may use the updated one or more TPMI and SRI pairs, the updated TPMI group, and/or the updated cycling order indicated by the other signaling communication to transmit the one or more PUSCH communications, to perform the scheduled retransmission of the PUSCH communication, and/or the like. In some aspects, UE 120 may identify the update in the other signaling communication by descrambling the other signaling communication based at least in part on the GC-RNTI and by identifying the location of the update based at least in part on the search offset.

In this way, BS 110 may transmit, to UE 120, a first signaling communication that configures a plurality of TPMI and SRI pairs. UE 120 may periodically cycle through the plurality of TPMI and SRI pairs to transmit PUSCH communications on an uplink to BS 110. This permits UE 120 to switch to different TPMI and SRI pairs without having to wait for additional signaling from BS 110. This reduces the delay between PUSCH communications, which increases PUSCH performance on the uplink. Moreover, this reduces the amount of signaling communications that BS 110 needs to transmit in order for UE 120 to be capable of switching to different TPMI and SRI pairs, which in turn reduces radio resource usage on the downlink.

As indicated above, FIGS. 9A-9C are provided as an example. Other examples may differ from what is described with respect to FIGS. 9A-9C.

Figure 10:
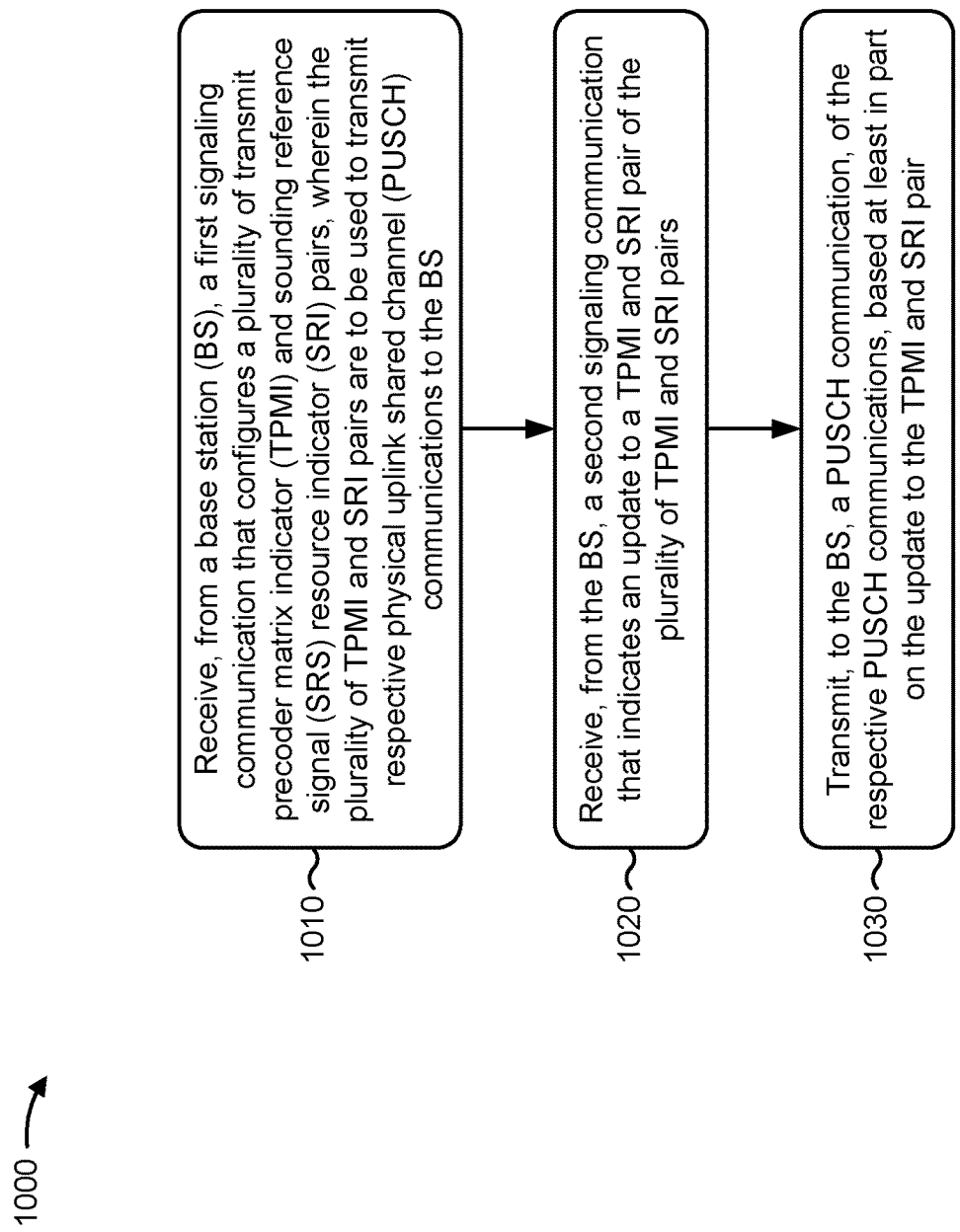
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs operations associated with dynamic PUSCH configuration.

As shown in FIG. 10, in some aspects, process 1000 may include receiving, from a BS, a first signaling communication that configures a plurality of TPMI and SRI pairs, wherein the plurality of TPMI and SRI pairs are to be used to transmit respective PUSCH communications to the BS (block 1010). For example, the UE (e.g., using antenna 252, DEMOD 254, MIMO detector 256, receive processor 258, transmit processor 264, controller/processor 280, memory 282, and/or the like) may receive, from a BS, a first signaling communication that configures a plurality of TPMI and SRI pairs, as described above. In some aspects, the plurality of TPMI and SRI pairs are to be used to transmit respective PUSCH communications to the BS.

As further shown in FIG. 10, in some aspects, process 1000 may include receiving, from the BS, a second signaling communication that indicates an update to a TPMI and SRI pair of the plurality of TPMI and SRI pairs (block 1020). For example, the UE (e.g., using antenna 252, DEMOD 254, MIMO detector 256, receive processor 258, transmit processor 264, controller/processor 280, memory 282, and/or the like) may receive, from the BS, a second signaling communication that indicates an update to a TPMI and SRI pair of the plurality of TPMI and SRI pairs, as described above.

As further shown in FIG. 10, in some aspects, process 1000 may include transmitting, to the BS, a PUSCH communication, of the respective PUSCH communications, based at least in part on the update to the TPMI and SRI pair (block 1030). For example, the UE (e.g., using TX MIMO processor 266, MOD 254, antenna 252 transmit processor 264, controller/processor 280, memory 282, and/or the like) may transmit, to the BS, a PUSCH communication, of the respective PUSCH communications, based at least in part on the update to the TPMI and SRI pair, as described above.

Process 1000 may include additional aspects, such as any single implementation or any combination of aspects described below and/or in connection with one or more other processes described elsewhere herein.

In a first aspect, the first signaling communication comprises an RRC configuration communication or a DCI communication. In a second aspect, alone or in combination with the first aspect, the first signaling communication may include an explicit indication of the plurality of TPMI and SRI pairs. In a third aspect, alone or in combination with one or more of the first and second aspects, the explicit indication comprises a TPMI index and an SRI index. In a fourth aspect, alone or in combination with one or more of the first through third aspects, the first signaling communication indicates respective TPMI group identifiers associated with the plurality of TPMI and SRI pairs.

In a fifth aspect, alone or in combination with one or more of the first through fourth aspects, the first signaling communication indicates a TPMI group identifier associated with a plurality of TPMIs of the plurality of TPMI and SRI pairs. In a sixth aspect, alone or in combination with one or more of the first through fifth aspects, the first signaling communication explicitly indicates a plurality of SRIs of the plurality of TPMI and SRI pairs. In a seventh aspect, alone or in combination with one or more of the first through sixth aspects, process 1000 comprises receiving a third signaling communication that schedules a retransmission of a particular PUSCH communication of the respective PUSCH communications. In an eighth aspect, alone or in combination with one or more of the first through seventh aspects, the third signaling communication indicates another plurality of TPMI and SRI pairs. In a tenth aspect, alone or in combination with one or more of the first through ninth aspects, process 1000 comprises using another TPMI and SRI pair, of the other plurality of TPMI and SRI pairs, for the retransmission of the particular PUSCH communication.

In an eleventh aspect, alone or in combination with one or more of the first through tenth aspects, process 1000 comprises using the other plurality of TPMI and SRI pairs to transmit other respective PUSCH communications to the BS. In a twelfth aspect, alone or in combination with one or more of the first through eleventh aspects, process 1000 comprises receiving a third signaling communication that indicates acknowledgement of a particular PUSCH communication of the respective PUSCH communications. In a thirteenth aspect, alone or in combination with one or more of the first through twelfth aspects, the third signaling communication indicates another plurality of TPMI and SRI pairs. In a fourteenth aspect, alone or in combination with one or more of the first through thirteenth aspects, process 1000 comprises using the other plurality of TPMI and SRI pairs to transmit other respective PUSCH communications to the BS.

In a fifteenth aspect, alone or in combination with one or more of the first through fourteenth aspects, process 1000 comprises receiving a third signaling communication that indicates a particular TPMI and SRI pair, of the plurality of TPMI and SRI pairs, that the UE is to use to transmit a particular PUSCH communication of the respective PUSCH communications and transmitting, based at least in part on receiving the third signaling communication, the particular PUSCH communication using the particular TPMI and SRI pair. In a sixteenth aspect, alone or in combination with one or more of the first through fifteenth aspects, the first signaling communication configures a GC-RNTI and search offset for the UE. In a seventeenth aspect, alone or in combination with one or more of the first through sixteenth aspects, process 1000 comprises descrambling the third signaling communication based at least in part on the GC-RNTI and identifying, based at least in part on the search offset, the particular TPMI and SRI pair indicated in the third signaling communication.

In an eighteenth aspect, alone or in combination with one or more of the first through seventeenth aspects, the first signaling communication configures a GC-RNTI and search offset for the UE. In a nineteenth aspect, alone or in combination with one or more of the first through eighteenth aspects, process 1000 comprises descrambling the second signaling communication based at least in part on the GC-RNTI and identifying, based at least in part on the search offset, the update to the TPMI and SRI pair indicated in the second communication. In a twentieth aspect, alone or in combination with one or more of the first through nineteenth aspects, process 1000 comprises transmitting, to the BS, the respective PUSCH communications using the plurality of TPMI and SRI pairs configured by the first signaling communication based at least in part on at least one of a cycling order specified in the first signaling communication, a cycling order specified in a table configured at the UE, a cycling order specified in a standard that is implemented in a wireless network in which the UE and the BS are included, or a cycling order associated with a TPMI group associated with the plurality of TPMI and SRI pairs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
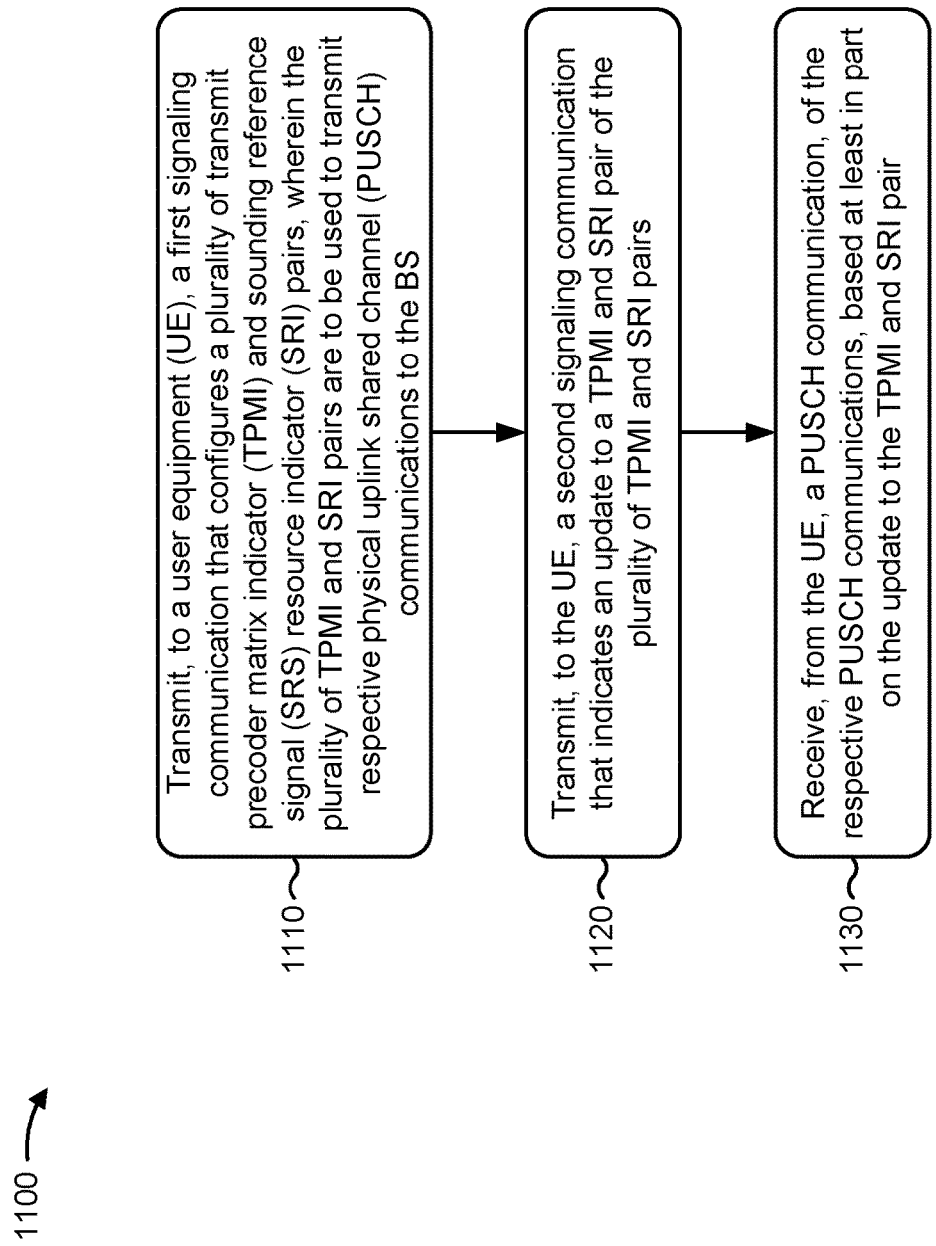
FIG. 11 is a diagram illustrating an example process performed, for example, by a base station (BS), in accordance with various aspects of the present disclosure.

FIG. 11 is a diagram illustrating an example process 1100 performed, for example, by a BS, in accordance with various aspects of the present disclosure. Example process 1100 is an example where a BS (e.g., BS 110) performs operations associated with dynamic PUSCH configuration.

As shown in FIG. 11, in some aspects, process 1100 may include transmitting, to a UE, a first signaling communication that configures a plurality of TPMI and SRI pairs, wherein the plurality of TPMI and SRI pairs are to be used to transmit respective PUSCH communications to the BS (block 1110). For example, the BS (e.g., using transmit processor 220, TX MIMO processor 230, MOD 232, antenna 234, controller/processor 240, memory 242, and/or the like) may transmit, to a UE, a first signaling communication that configures a plurality of TPMI and SRI pairs, as described above. In some aspects, the plurality of TPMI and SRI pairs are to be used to transmit respective PUSCH communications to the BS.

As further shown in FIG. 11, in some aspects, process 1100 may include transmitting, to the UE, a second signaling communication that indicates an update to a TPMI and SRI pair of the plurality of TPMI and SRI pairs (block 1120). For example, the BS (e.g., using transmit processor 220, TX MIMO processor 230, MOD 232, antenna 234, controller/processor 240, memory 242, and/or the like) may transmit, to the UE, a second signaling communication that indicates an update to a TPMI and SRI pair of the plurality of TPMI and SRI pairs, as described above.

As further shown in FIG. 11, in some aspects, process 1100 may include receiving, from the UE, a PUSCH communication, of the respective PUSCH communications, based at least in part on the update to the TPMI and SRI pair (block 1130). For example, the BS (e.g., using antenna 234, DEMOD 232, MIMO detector 236, receive processor 238, controller/processor 240, memory 242, and/or the like) may receive, from the UE, a PUSCH communication, of the respective PUSCH communications, based at least in part on the update to the TPMI and SRI pair, as described above.

Process 1100 may include additional aspects, such as any single implementation or any combination of aspects described below and/or in connection with one or more other processes described elsewhere herein.

In a first aspect, the first signaling communication comprises an RRC configuration communication or a DCI communication. In a second aspect, alone or in combination with the first aspect, the first signaling communication includes an explicit indication of the plurality of TPMI and SRI pairs. In a third aspect, alone or in combination with one or more of the first and second aspects, the explicit indication comprises a TPMI index and an SRI index. In a fourth aspect, alone or in combination with one or more of the first through third aspects, the first signaling communication indicates respective TPMI group identifiers associated with the plurality of TPMI and SRI pairs. In a fifth aspect, alone or in combination with one or more of the first through fourth aspects, the first signaling communication indicates a TPMI group identifier associated with a plurality of TPMIs of the plurality of TPMI and SRI pairs. In a sixth aspect, alone or in combination with one or more of the first through fifth aspects, the first signaling communication explicitly indicates a plurality of SRIs of the plurality of TPMI and SRI pairs.

In a seventh aspect, alone or in combination with one or more of the first through sixth aspects, process 1100 comprises transmitting a third signaling communication that schedules a retransmission of a particular PUSCH communication of the respective PUSCH communications. In an eighth aspect, alone or in combination with one or more of the first through seventh aspects, the third signaling communication indicates another plurality of TPMI and SRI pairs. In a ninth aspect, alone or in combination with one or more of the first through eighth aspects, process 1100 comprises receiving, based at least in part on another TPMI and SRI pair of the other plurality of TPMI and SRI pairs, the retransmission of the particular PUSCH communication.

In a tenth aspect, alone or in combination with one or more of the first through ninth aspects, process 1100 comprises receiving, based at least in part on the other plurality of TPMI and SRI pairs, other respective PUSCH communications from the UE. In an eleventh aspect, alone or in combination with one or more of the first through tenth aspects, process 1100 comprises transmitting a third signaling communication that indicates acknowledgement of a particular PUSCH communication of the respective PUSCH communications. In a twelfth aspect, alone or in combination with one or more of the first through eleventh aspects, the third signaling communication indicates another plurality of TPMI and SRI pairs. In a thirteenth aspect, alone or in combination with one or more of the first through twelfth aspects, process 1100 comprises receiving, based at least in part on the other plurality of TPMI and SRI pairs, other respective PUSCH communications from the UE.

In a fourteenth aspect, alone or in combination with one or more of the first through thirteenth aspects, process 1100 comprises transmitting a third signaling communication that indicates a particular TPMI and SRI pair, of the plurality of TPMI and SRI pairs, that the UE is to use to transmit a particular PUSCH communication of the respective PUSCH communications and receiving, based at least in part on the particular TPMI and SRI pair, the particular PUSCH communication from the UE. In a fifteenth aspect, alone or in combination with one or more of the first through fourteenth aspects, the first signaling communication configures a GC-RNTI and search offset for the UE. In a sixteenth aspect, alone or in combination with one or more of the first through fifteenth aspects, process 1100 comprises scrambling the third signaling communication based at least in part on the GC-RNTI and configuring the particular TPMI and SRI pair at a location in the third signaling communication that is based at least in part on the search offset.

In a seventeenth aspect, alone or in combination with one or more of the first through sixteenth aspects, the first signaling communication configures a GC-RNTI and search offset for the UE. In an eighteenth aspect, alone or in combination with one or more of the first through seventeenth aspects, process 1100 comprises scrambling the second signaling communication based at least in part on the GC-RNTI and configuring the update to the TPMI and SRI pair at a location in the second signaling communication that is based at least in part on the search offset.

In a nineteenth aspect, alone or in combination with one or more of the first through eighteenth aspects, process 1100 comprises receiving, from the UE and based at least in part on the plurality of TPMI and SRI pairs configured by the first signaling communication, the respective PUSCH communications based at least in part on at least one of a cycling order specified in the first signaling communication, a cycling order specified in a table configured at the UE, a cycling order specified in a standard that is implemented in a wireless network in which the UE and the BS are included, or a cycling order associated with a TPMI group associated with the plurality of TPMI and SRI pairs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
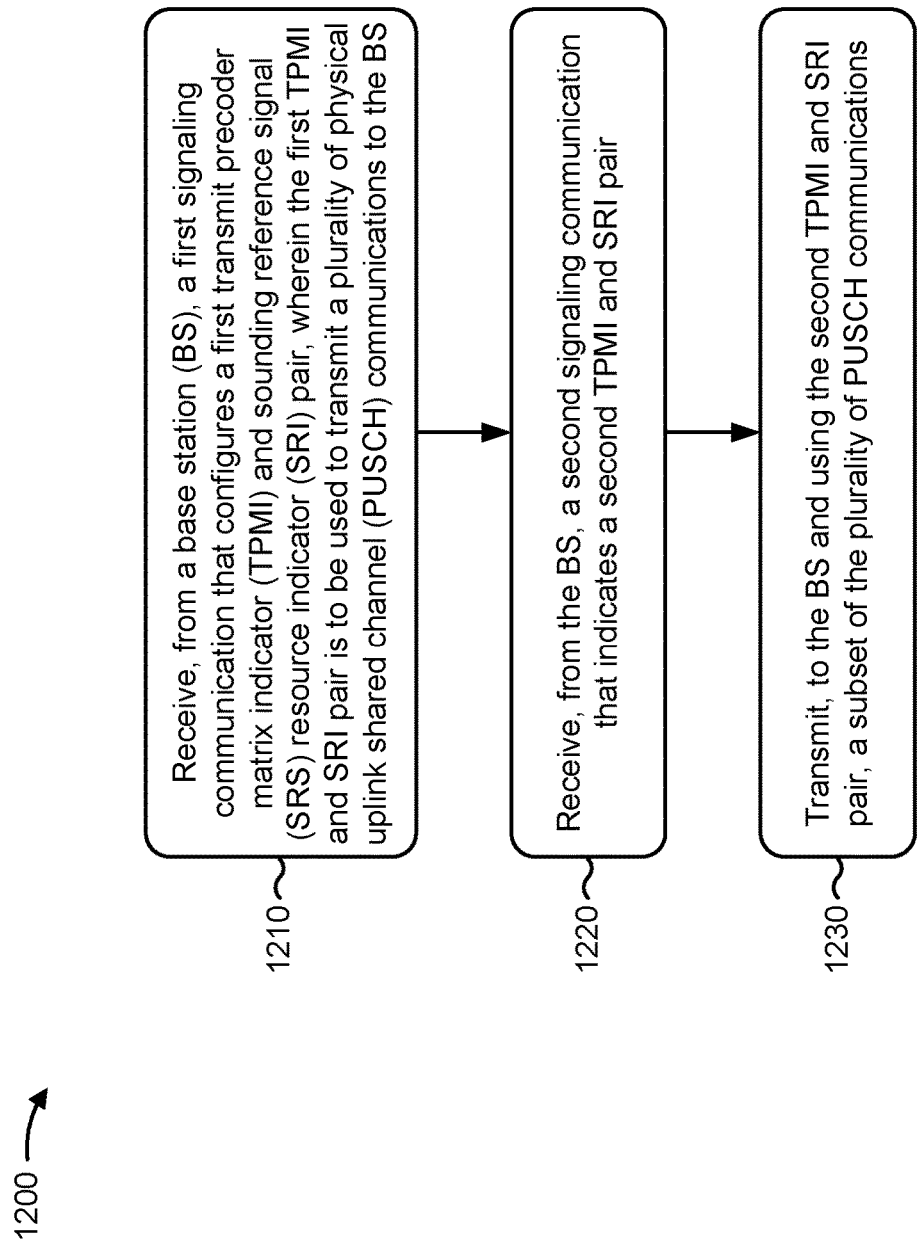
FIG. 12 is a diagram illustrating an example process performed, for example, by a UE, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120) performs operations associated with dynamic PUSCH configuration.

As shown in FIG. 12, in some aspects, process 1200 may include receiving, from a BS, a first signaling communication that configures a first TPMI and SRI pair, wherein the first TPMI and SRI pair is to be used to transmit a plurality of PUSCH communications to the BS (block 1210). For example, the UE (e.g., using antenna 252, DEMOD 254, MIMO detector 256, receive processor 258, transmit processor 264, controller/processor 280, memory 282, and/or the like) may receive, from a BS, a first signaling communication that configures a first TPMI and SRI pair, as described above. In some aspects, the first TPMI and SRI pair is to be used to transmit a plurality of PUSCH communications to the BS.

As further shown in FIG. 12, in some aspects, process 1200 may include receiving, from the BS, a second signaling communication that indicates a second TPMI and SRI pair (block 1220). For example, the UE (e.g., using antenna 252, DEMOD 254, MIMO detector 256, receive processor 258, transmit processor 264, controller/processor 280, memory 282, and/or the like) may receive, from the BS, a second signaling communication that indicates a second TPMI and SRI pair, as described above.

As further shown in FIG. 12, in some aspects, process 1200 may include transmitting, to the BS and using the second TPMI and SRI pair, a subset of the plurality of PUSCH communications (block 1230). For example, the UE (e.g., using TX MIMO processor 266, MOD 254, antenna 252, transmit processor 264, controller/processor 280, memory 282, and/or the like) may transmit, to the BS and using the second TPMI and SRI pair, a subset of the plurality of PUSCH communications, as described above.

Process 1200 may include additional aspects, such as any single implementation or any combination of aspects described below and/or in connection with one or more other processes described elsewhere herein.

In a first aspect, the first signaling communication includes an explicit indication of the first plurality of TPMI and SRI pairs comprising a first TPMI index and a first SRI index, and the second signaling communication includes an explicit indication of the second plurality of TPMI and SRI pairs comprising a second TPMI index and an SRI index. In a second aspect, alone or in combination with the first aspect, the first signaling communication indicates first respective TPMI group identifiers associated with the first plurality of TPMI and SRI pair, and the second signaling communication indicates second respective TPMI group identifiers associated with the second plurality of TPMI and SRI pairs.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
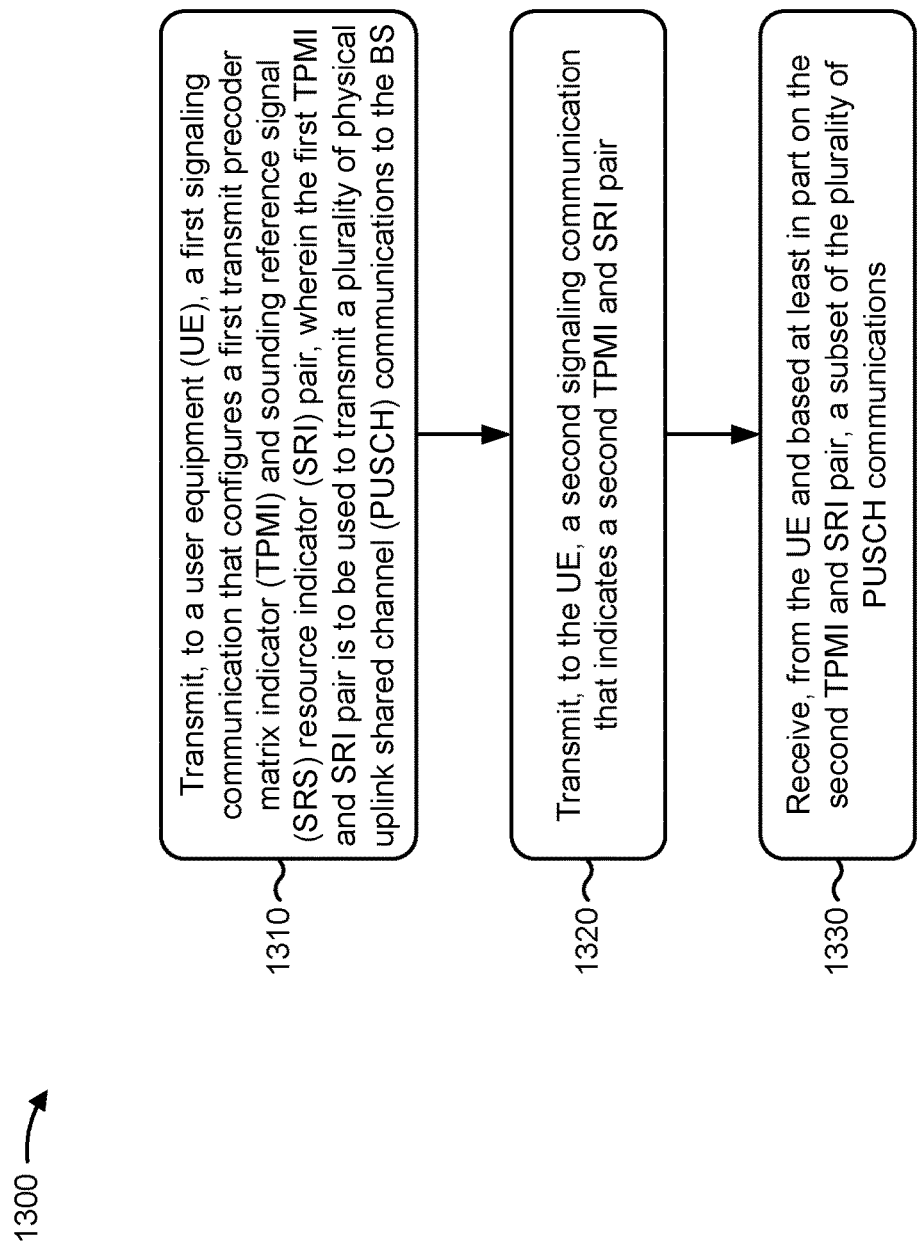
FIG. 13 is a diagram illustrating an example process performed, for example, by a BS, in accordance with various aspects of the present disclosure.

FIG. 13 is a diagram illustrating an example process 1300 performed, for example, by a BS, in accordance with various aspects of the present disclosure. Example process 1300 is an example where a BS (e.g., BS 110) performs operations associated with dynamic PUSCH configuration.

As shown in FIG. 13, in some aspects, process 1300 may include transmitting, to a UE, a first signaling communication that configures a first TPMI and SRI pair, wherein the first TPMI and SRI pair is to be used to transmit a plurality of PUSCH communications to the BS (block 1310). For example, the BS (e.g., using transmit processor 220, TX MIMO processor 230, MOD 232, antenna 234, controller/processor 240, memory 242, and/or the like) may transmit, to a UE, a first signaling communication that configures a first TPMI and SRI pair, as described above. In some aspects, the first TPMI and SRI pair is to be used to transmit a plurality of PUSCH communications to the BS.

As further shown in FIG. 13, in some aspects, process 1300 may include transmitting, to the UE, a second signaling communication that indicates a second TPMI and SRI pair (block 1320). For example, the BS (e.g., using transmit processor 220, TX MIMO processor 230, MOD 232, antenna 234, controller/processor 240, memory 242, and/or the like) may transmit, to the UE, a second signaling communication that indicates a second TPMI and SRI pair, as described above.

As further shown in FIG. 13, in some aspects, process 1300 may include receive, from the UE and based at least in part on the second TPMI and SRI pair, a subset of the plurality of PUSCH communications (block 1330). For example, the BS (e.g., using antenna 234, DEMOD 232, MIMO detector 236, receive processor 238, controller/processor 240, memory 242, and/or the like) may receive, from the UE and based at least in part on the second TPMI and SRI pair, a subset of the plurality of PUSCH communications, as described above.

Process 1300 may include additional aspects, such as any single implementation or any combination of aspects described below and/or in connection with one or more other processes described elsewhere herein.

In a first aspect, the first signaling communication includes an explicit indication of the first plurality of TPMI and SRI pairs comprising a first TPMI index and a first SRI index, and the second signaling communication includes an explicit indication of the second plurality of TPMI and SRI pairs comprising a second TPMI index and an SRI index. In a second aspect, alone or in combination with the first aspect, the first signaling communication indicates first respective TPMI group identifiers associated with the first plurality of TPMI and SRI pair, and the second signaling communication indicates second respective TPMI group identifiers associated with the second plurality of TPMI and SRI pairs.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a first signaling communication that configures a plurality of transmit precoder matrix indicator (TPMI) and sounding reference signal (SRS) resource indicator (SRI) pairs,
      wherein the plurality of TPMI and SRI pairs are to be used to transmit respective physical uplink shared channel (PUSCH) communications;
   receiving a second signaling communication that indicates an update to a TPMI and SRI pair of the plurality of TPMI and SRI pairs; and
   transmitting a PUSCH communication, of the respective PUSCH communications, based at least in part on:
      an indication that the UE is to use a particular TPMI and SRI pair, of the plurality of TPMI and SRI pairs, to transmit the PUSCH communication, or
      a cycling order that specifies an order in which the UE is to cycle through the plurality of TPMI and SRI pairs.

2. The method of claim 1, wherein the first signaling communication comprises:
   a radio resource control (RRC) configuration communication, or
   a downlink control information (DCI) communication.

3. The method of claim 1, wherein the first signaling communication includes an explicit indication of the plurality of TPMI and SRI pairs,
   wherein the explicit indication comprises:
      a TPMI index and an SRI index.

4. The method of claim 1, wherein the first signaling communication indicates respective TPMI group identifiers associated with the plurality of TPMI and SRI pairs.

5. The method of claim 1, wherein the first signaling communication indicates a TPMI group identifier associated with a plurality of TPMIs of the plurality of TPMI and SRI pairs; and
   wherein the first signaling communication explicitly indicates a plurality of SRIs of the plurality of TPMI and SRI pairs.

6. The method of claim 1, further comprising:
   receiving a third signaling communication that schedules a retransmission of a particular PUSCH communication of the respective PUSCH communications,
      wherein the third signaling communication indicates another plurality of TPMI and SRI pairs; and
   using another TPMI and SRI pair, of the other plurality of TPMI and SRI pairs, for the retransmission of the particular PUSCH communication.

7. The method of claim 6, further comprising:
   using the other plurality of TPMI and SRI pairs to transmit other respective PUSCH communications to the BS.

8. The method of claim 1, further comprising:
   receiving a third signaling communication that indicates acknowledgement of a particular PUSCH communication of the respective PUSCH communications,
      wherein the third signaling communication indicates another plurality of TPMI and SRI pairs; and
   using the other plurality of TPMI and SRI pairs to transmit other respective PUSCH communications.

9. The method of claim 1, further comprising:
   receiving a third signaling communication that includes the indication,
      wherein transmitting the PUSCH communication comprises:
         transmitting, based at least in part on receiving the third signaling communication, the PUSCH communication using the particular TPMI and SRI pair.

10. The method of claim 9, wherein the first signaling communication configures a group common radio network temporary identifier (GC-RNTI) and search offset for the UE; and
    wherein the method further comprises:
       descrambling the third signaling communication based at least in part on the GC- RNTI; and
       identifying, based at least in part on the search offset, the particular TPMI and SRI pair indicated in the third signaling communication.

11. The method of claim 1, wherein the first signaling communication configures a group common radio network temporary identifier (GC-RNTI) and search offset for the UE; and
    wherein the method further comprises:
       descrambling the second signaling communication based at least in part on the GC-RNTI; and
       identifying, based at least in part on the search offset, the update to the TPMI and SRI pair indicated in the second communication.

12. The method of claim 1, wherein transmitting the PUSCH communication comprises:
    transmitting the PUSCH communication based at least in part on the cycling order, and
    wherein the cycling order is at least one of:
       specified in the first signaling communication,
       specified in a table configured at the UE,
       specified in a standard that is implemented in a wireless network in which the UE is included, or
       associated with a TPMI group associated with the plurality of TPMI and SRI pairs.

13. A method of wireless communication comprising:
    transmitting, to a user equipment (UE), a first signaling communication that configures a plurality of transmit precoder matrix indicator (TPMI) and sounding reference signal (SRS) resource indicator (SRI) pairs,
       wherein the plurality of TPMI and SRI pairs are to be used to transmit respective physical uplink shared channel (PUSCH) communications;
    transmitting, to the UE, a second signaling communication that indicates an update to a TPMI and SRI pair of the plurality of TPMI and SRI pairs; and
    receiving, from the UE, a PUSCH communication, of the respective PUSCH communications, based at least in part on:
       an indication that the UE is to use a particular TPMI and SRI pair, of the plurality of TPMI and SRI pairs, to transmit the PUSCH communication, or
       a cycling order that specifies an order in which the UE is to cycle through the plurality of TPMI and SRI pairs.

14. The method of claim 13, wherein the first signaling communication comprises:
    a radio resource control (RRC) configuration communication, or
    a downlink control information (DCI) communication.

15. The method of claim 13, wherein the first signaling communication includes an explicit indication of the plurality of TPMI and SRI pairs,
wherein the explicit indication comprises:
a TPMI index and an SRI index.

16. The method of claim 13, wherein the first signaling communication indicates respective TPMI group identifiers associated with the plurality of TPMI and SRI pairs.

17. The method of claim 13, wherein the first signaling communication indicates a TPMI group identifier associated with a plurality of TPMIs of the plurality of TPMI and SRI pairs; and
wherein the first signaling communication explicitly indicates a plurality of SRIs of the plurality of TPMI and SRI pairs.

18. The method of claim 13, further comprising:
transmitting a third signaling communication that schedules a retransmission of a particular PUSCH communication of the respective PUSCH communications,
wherein the third signaling communication indicates another plurality of TPMI and SRI pairs; and
receiving, based at least in part on another TPMI and SRI pair of the other plurality of TPMI and SRI pairs, the retransmission of the particular PUSCH communication.

19. The method of claim 18, further comprising:
receiving, based at least in part on the other plurality of TPMI and SRI pairs, other respective PUSCH communications from the UE.

20. The method of claim 13, further comprising:
transmitting a third signaling communication that indicates acknowledgement of a particular PUSCH communication of the respective PUSCH communications, wherein the third signaling communication indicates another plurality of TPMI and SRI pairs; and
receiving, based at least in part on the other plurality of TPMI and SRI pairs, other respective PUSCH communications from the UE.

21. The method of claim 13, wherein receiving the PUSCH communication comprises:
transmitting a third signaling communication that that includes the indication; and
receiving, based at least in part on the particular TPMI and SRI pair, the PUSCH communication from the UE.

22. The method of claim 21, wherein the first signaling communication configures a group common radio network temporary identifier (GC-RNTI) and search offset for the UE; and
wherein the method further comprises:
scrambling the third signaling communication based at least in part on the GC-RNTI; and
configuring the particular TPMI and SRI pair at a location in the third signaling communication that is based at least in part on the search offset.

23. The method of claim 13, wherein the first signaling communication configures a group common radio network temporary identifier (GC-RNTI) and search offset for the UE; and
wherein the method further comprises:
scrambling the second signaling communication based at least in part on the GC-RNTI; and
configuring the update to the TPMI and SRI pair at a location in the second signaling communication that is based at least in part on the search offset.

24. The method of claim 13, further comprising:
receiving, from the UE, the PUSCH communication based at least in part on the cycling order,
wherein the cycling order is at least one of:
specified in the first signaling communication,
specified in a table configured at the UE,
specified in a standard that is implemented in a wireless network in which the UE is included, or
associated with a TPMI group associated with the plurality of TPMI and SRI pairs.

25. A user equipment (UE) for wireless communication, comprising:
one or more memories; and
one or more processors, coupled to the one or more memories, configured to cause the UE to:
receive a first signaling communication that configures a plurality of transmit precoder matrix indicator (TPMI) and sounding reference signal (SRS) resource indicator (SRI) pairs,
wherein the plurality of TPMI and SRI pairs are to be used to transmit respective physical uplink shared channel (PUSCH) communications;
receive a second signaling communication that indicates an update to a TPMI and SRI pair of the plurality of TPMI and SRI pairs; and
transmit a PUSCH communication, of the respective PUSCH communications, based at least in part on:
an indication that the UE is to use a particular TPMI and SRI pair, of the plurality of TPMI and SRI pairs, to transmit the PUSCH communication, or
a cycling order that specifies an order in which the UE is to cycle through the plurality of TPMI and SRI pairs.

26. The UE of claim 25, wherein the first signaling communication comprises:
a radio resource control (RRC) configuration communication, or
a downlink control information (DCI) communication.

27. The UE of claim 25, wherein the one or more processors are further configured to cause the UE to:
receive a third signaling communication that includes the indication,
wherein the one or more processors, to cause the UE to transmit the PUSCH communication, are configured to cause the UE to:
transmit, based at least in part on the indication, the PUSCH communication using the particular TPMI and SRI pair.

28. The UE of claim 25,
wherein the one or more processors, to cause the UE to transmit the PUSCH communication, are configured to cause the UE to:
transmit the PUSCH communication based at least in part on the cycling order, and
wherein the cycling order is at least one of:
specify in the first signaling communication,
specify in a table configured at the UE,
specify in a standard that is implemented in a wireless network in which the UE is included, or
associate with a TPMI group associated with the plurality of TPMI and SRI pairs.

29. The UE of claim 25,
wherein the one or more processors, to cause the UE to receive the first signaling communication, are configured to cause the UE to:
receive the first signaling communication from a base station,
wherein the one or more processors, to cause the UE to receive the first signaling communication, are configured to cause the UE to:

receive the second signaling communication from the base station, and wherein the one or more processors, to cause the UE to transmit the PUSCH communication, are configured to cause the UE to:

transmit the PUSCH communication to the base station.

30. A network entity for wireless communication, comprising:

one or more memories; and one or more processors, coupled to the one or more memories, configured to cause the network entity to:

transmit, to a user equipment (UE), a first signaling communication that configures a plurality of transmit precoder matrix indicator (TPMI) and sounding reference signal (SRS) resource indicator (SRI) pairs, wherein the plurality of TPMI and SRI pairs are to be used to transmit respective physical uplink shared channel (PUSCH) communications;

transmit, to the UE, a second signaling communication that indicates an update to a TPMI and SRI pair of the plurality of TPMI and SRI pairs; and receive, from the UE, a PUSCH communication, of the respective PUSCH communications, based at least in part on:

an indication that the UE is to use a particular TPMI and SRI pair, of the plurality of TPMI and SRI pairs, to transmit the PUSCH communication, or a cycling order that specifies an order in which the UE is to cycle through the plurality of TPMI and SRI pairs.

* * * * *